(12) United States Patent
Ohta

(10) Patent No.: US 6,822,688 B2
(45) Date of Patent: Nov. 23, 2004

(54) MOVABLE-LENS POSITION CONTROL APPARATUS

(75) Inventor: Seiya Ohta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/299,876

(22) Filed: Apr. 27, 1999

(65) Prior Publication Data

US 2003/0030741 A1 Feb. 13, 2003

Related U.S. Application Data

(62) Division of application No. 08/787,545, filed on Jan. 22, 1997, now Pat. No. 6,268,885.

(30) Foreign Application Priority Data

Jan. 31, 1996 (JP) ............................................. 8-037428
May 21, 1996 (JP) ............................................. 8-150003

(51) Int. Cl.[7] .......................... H04N 5/225; H04N 5/232
(52) U.S. Cl. ...................... 348/349; 348/335; 348/347; 396/97
(58) Field of Search ............................... 348/345, 347, 348/349, 351, 354, 355, 356, 357, 358; 355/55, 56; 396/79–82, 96, 97, 231; 374/130, 132; G03B 13/00

(56) References Cited

U.S. PATENT DOCUMENTS

| | | | | |
|---|---|---|---|---|
| 4,804,831 A | | 2/1989 | Baba et al. ............... 250/201.2 |
| 4,920,369 A | | 4/1990 | Kaneda et al. ............... 396/81 |
| 4,982,216 A | | 1/1991 | Kudo et al. .................. 396/97 |
| 5,124,738 A | | 6/1992 | Yamashita ................... 355/56 |
| 5,162,836 A | * | 11/1992 | Ishimaru ..................... 396/231 |
| 5,388,907 A | * | 2/1995 | Aoyama ..................... 374/130 |
| 5,412,448 A | * | 5/1995 | Kunishige ................... 396/97 |
| 5,552,847 A | * | 9/1996 | Watanabe ................... 396/91 |
| 5,600,496 A | * | 2/1997 | Mori ......................... 359/820 |
| 5,614,983 A | * | 3/1997 | Iwane ........................ 396/97 |
| 5,679,946 A | * | 10/1997 | Mukai ..................... 250/201.2 |
| 5,809,315 A | * | 9/1998 | Ohtsuka ..................... 396/231 |
| 5,839,002 A | * | 11/1998 | Miyake ...................... 396/91 |
| 5,895,129 A | * | 4/1999 | Ohta .......................... 396/79 |
| 5,914,629 A | * | 6/1999 | Maki ......................... 327/512 |
| 6,046,770 A | * | 4/2000 | Uemura et al. ........ 348/240.99 |
| 6,144,805 A | * | 11/2000 | Ogino ........................ 396/81 |
| 6,215,959 B1 | * | 4/2001 | Mori ......................... 396/91 |
| 6,268,885 B1 | * | 7/2001 | Ohta ......................... 348/345 |

FOREIGN PATENT DOCUMENTS

| | | | | |
|---|---|---|---|---|
| JP | 59-133511 | 7/1984 | ............ G02B/7/11 |
| JP | 61-133912 | 6/1986 | ............ G02B/7/10 |
| JP | 7-270674 | 10/1995 | ............ G02B/7/28 |
| JP | 7-287162 | 10/1995 | ............ G02B/7/24 |

* cited by examiner

Primary Examiner—Ngoc-Yen Vu
(74) Attorney, Agent, or Firm—Fitzpatrick, Cella, Harper & Scinto

(57) ABSTRACT

An optical apparatus having an image-forming optical system comprising a movable lens, comprises a lens drive mechanism for moving the movable lens, a focus adjusting device for automatically adjusting an imaging position by moving the movable lens or another optical element, based on detection of a focus detecting-device, a detecting device for detecting a temperature change or a humidity change, and a control device for actuating the lens drive mechanism upon stop of operation of the focus adjusting device, based on detection in the detecting device, to move the movable lens for correction.

13 Claims, 15 Drawing Sheets

MOVABLE-LENS POSITION CONTROL APPARATUS

This application is a division of application Ser. No. 08/787,545 filed Jan. 22, 1997 now U.S. Pat. No. 6,268,885.

BACKGROUND OF THE INVENTION

1. Field of the Invention

The present invention relates to an optical apparatus having a moving lens.

2. Related Background Art

In the field of the optical apparatus including cameras, compactification of photographing optical system and reduction of image size of solid state image sensing device has quickly been advancing these years. In addition, plastic materials are often used as optical materials for making the photographing optical system. Use of plastic materials has such features that a lens can be molded readily by mold, that arbitrariness of shape thereof is high, and that the cost merit is higher than that of glass materials. Because of such features, lenses made of plastic materials are frequently used in a viewfinder system, in an infrared active autofocus unit, in parts of the photographing optical system, and so on.

The plastic materials show greater changes of physical properties against environmental changes than inorganic glass materials. For example, PMMA of a plastic material has a large coefficient of linear expansion: $67.9 \times 10^{-6}/°$ C. typical, whereas LaK 14 (available from OHARA) of an inorganic glass has a coefficient of linear expansion one order of magnitude smaller than it: $57 \times 10^{-7}/°$ C. As for changes of refractive index against temperature changes, PMMA shows 1.0 to $1.2 \times 10^{-4}/°$ C. typical, whereas the above LaK 14 shows 3.9 to $4.4 \times 10^{-6}/°$ C. at the D-line two orders of magnitude smaller than those.

As explained above, the plastic materials show greater changes of various optical constants (the refractive index, the shape, etc.) against temperature changes than the inorganic glass materials. For example, the lenses made of the plastic materials, so-called plastic lenses, have greater changes of focal length against temperature changes than the lenses made of the inorganic glass materials.

Further, the plastic materials have larger water absorption rates than the inorganic glass materials. Therefore, the various optical constants of the plastic lenses change greater against humidity changes, similarly as against temperature changes, than the lenses made of the inorganic glass materials.

The effects as discussed previously can be attained by using the plastic lens in parts of the optical system. However, it raises the problem that the optical properties including the focal length change greater against environmental changes, particularly against temperature changes or against humidity changes, than in the case of use of the lenses made of the inorganic glass materials.

The recent optical apparatus is compactified by compactifying the photographing optical system, compactifying the solid state image sensing device, and increasing the density of various elements. This raises the problem that the temperature changes, moisture changes, or the like increase an effect of deviation of the image plane of the optical system used in the optical apparatus with respect to the intended image plane. It is, therefore, a significant issue how to effectively correct the deviation of the imaging position due to such environmental changes.

Further, many recent optical devices are provided with an autofocusing function (AF function) for automatically detecting the in-focus position of optical system. During photography with operation of the AF function, for example, if any obstacle such as a car or a pedestrian goes between the optical apparatus and the object, the AF means will make the optical system in focus with the obstacle. This will result in failing to image the target object on the image plane. Thus, there was the problem that photography must be made under stop of the AF function in order to avoid it. Stop of the operation of the AF function during photography is not preferred, because the position of the image plane changes greatly with the environmental changes as discussed previously in the case of the optical apparatus using the optical system including the plastic lens.

SUMMARY OF THE INVENTION

One aspect of the invention is to provide an optical apparatus arranged to detect temperature or/and humidity and to effect correction of position based on a detection result thereof when a moving lens is at a stop of operation.

The other aspects will become apparent from the detailed description that follows.

DETAILED DESCRIPTION OF THE PREFERRED EMBODIMENTS

Figure 1:
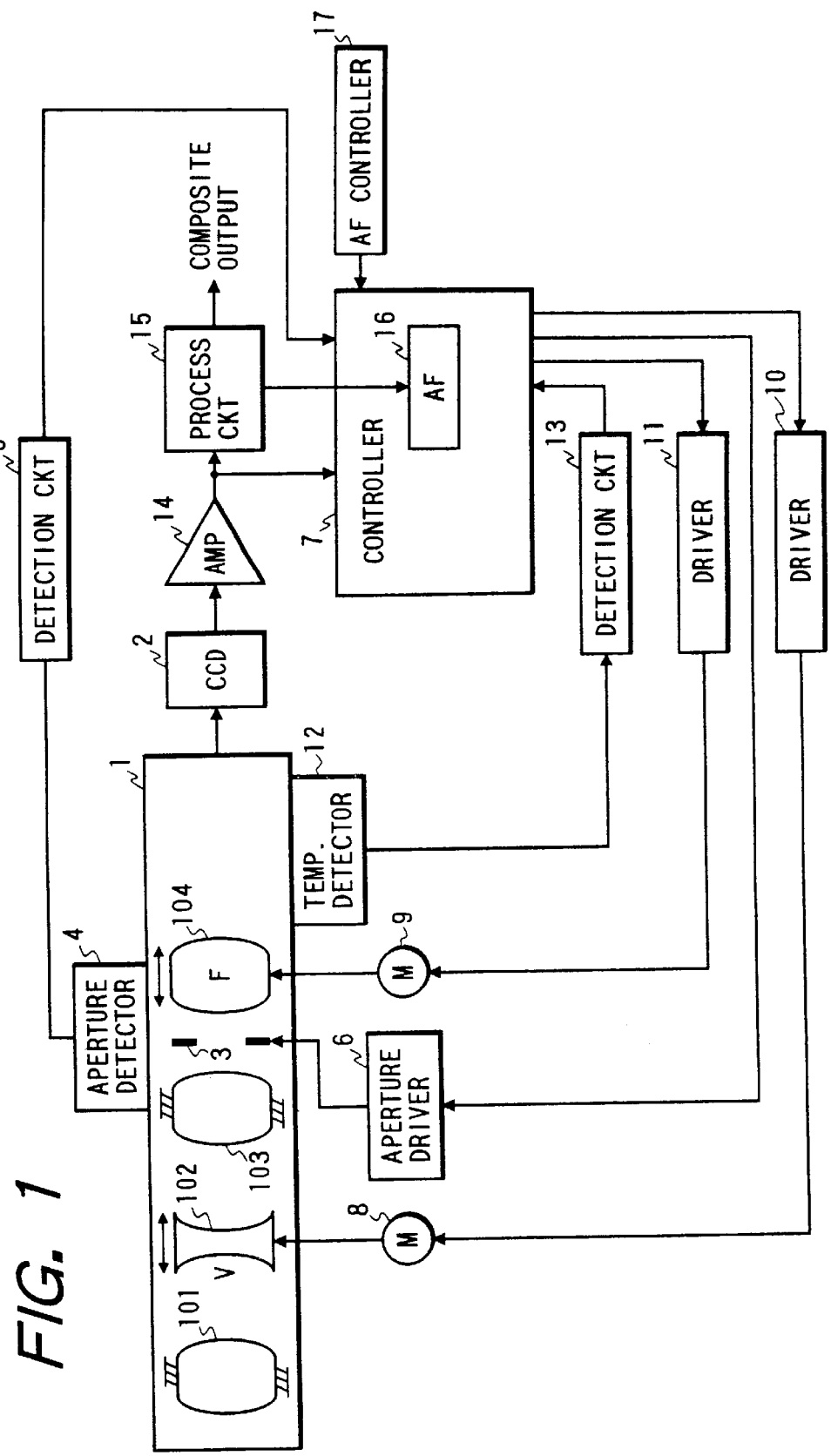
FIG. 1 is a schematic drawing to show the principal part of Embodiment 1 according to the present invention.

FIG. 1 is a block diagram to show the principal part of Embodiment 1 of the present invention. In the figure numeral 1 denotes an optical system (a photographing system), which is a rear focus zoom lens (hereinafter referred to as "RFZ" lens) of the so-called four-unit configuration composed of four lens units.

The RFZ lens 1 is comprised of a first lens unit (hereinafter referred to as "front lens") 101 being a fixed lens unit, a second lens unit (hereinafter referred to as "variator") 102 with a magnification change or zoom function being a moving lens unit, a third lens unit (hereinafter referred to as "afocal") 103 being a fixed lens unit, and a fourth lens unit (hereinafter referred to as "RR") 104 being a moving lens unit and having a function as a compensator for compensating for variations in image plane due to focus and magnification changes.

Practically, the above lens units are composed of a plurality of lenses. For example, in the present embodiment, the front lens 101 is comprised of three lenses, the variator 102 of three lenses, the afocal 103 of a single lens, and the RR (rear relay) 104 of two lenses, thus constituting the four-unit and 9-lens configuration.

In the present embodiment, a plastic lens made of a plastic material is used in at least one lens unit out of the lens units. The material for the plastic lens may be selected from acrylic based plastics, polyolefin based plastics, polycarbonate, and so on.

There is no specific limitation on where the plastic lens should be used in the lens units in the present embodiment, and there are some cases without using the plastic lens in the lens units at all.

Numeral 2 designates a photoelectric conversion element (image pickup means) such as a CCD, and 3 an aperture member for adjusting a quantity of light incident to the photoelectric conversion element 2. Numeral 6 is an aperture driver, which is comprised of an iG meter or a STEP motor or the like and which changes the area of the aperture of the aperture member 3 by driving aperture wings in the aperture member 3 nearly perpendicularly to the optic axis, based on a signal from a controller 7, so as to keep the quantity of light incident to the photoelectric conversion element 2 constant. Numeral 4 designates an aperture position detector, which detects the size of the aperture of the aperture member 3. Numeral 5 represents a detection circuit for converting a detection signal from the aperture position detector 4 to a signal processable by the controller 7 and outputting the obtained signal.

Numerals 8, 9 are driving units such as step motors for driving the moving lens units 102, 104, respectively, and numerals 10, 11 are drivers for driving the driving units 8, 9, respectively. Numeral 12 stands for a temperature detector such as a thermistor or thermally sensitive resistor, and numeral 13 for a detection circuit for detecting an output from the temperature detector 12 and outputting a signal to the controller 7. For detecting humidity, the element 12 serves as a humidity detector such as an electrostatic capacity type sensor or a thermistor.

Numeral 14 denotes an amplifier for amplifying an output from the photoelectric conversion element 2, 15 a process circuit for converting a signal from the amplifier 14 to a signal such as an NTSC video signal, 16 an autofocusing device for generating a signal for autofocusing (hereinafter referred to as AF) from a signal output from the process circuit 15 and effecting the AF operation, and 17 an AF controller comprised of a switch for turning the AF operation of AF device 16 on or off. An example of the method of AF is the so-called hill climbing method, for example, the method as proposed in U.S. Pat. No. 4,804,831.

In the present embodiment, the controller 7 obtains a drive amount of RR 104, based on an in-focus signal from the AF device 16, and supplies it to the driver 11. Then the driver 11 drives the motor 9, based on the in-focus signal, to move the RR 104, thereby effecting AF.

The present embodiment employs the plastic lens in at least one lens unit. Therefore, a temperature change or a humidity change around the plastic lens due to an environmental change will change the shape of the plastic lens as described previously and change the refractive index thereof because of a large temperature coefficient of refractive index of the material, thereby greatly changing the focal length. The following description mainly concerns the temperature changes as the environmental changes, but it is noted that the same can be applied to the humidity changes.

The temperature changes will change focal lengths of the respective lens units, which will also change the total focal length of the lens system 1. As a result, the image plane will deviate from the image plane at reference temperature (which is set at 20° C. in the present embodiment). Namely, defocus occurs.

Accordingly, when photography is carried out in fixed focus without action of the AF function, defocus occurs with changes of temperature, which is a problem very undesirable for the optical apparatus. In order to solve this problem, the present embodiment is thus arranged to detect the temperature and correct the focus in accordance with a temperature change.

Specifically, even if an environmental change (a temperature change or a humidity change) occurs while the AF controller 17 stops the operation of the AF device 16 (or stops the drive unit 9), the controller 7 drives the motor 9 through the driver 11, based on the output signal from the detection circuit 13, to move the RR (moving lens) 104. This effects correction for the position of the image plane, thereby achieving a good image.

The controller 7 has data of focus moving amount per unit temperature (temperature correction coefficient data) Trr. Then, the focus moving amount data Trr is multiplied by a temperature change amount $\Delta T$ to obtain a focus moving amount or correction amount data (temperature-corrected position data) Prr.

$$\Delta T = |\text{detected temperature} - \text{reference temperature}| Prr = \Delta T \times Trr$$

Here, the temperature correction coefficient data is defined as a function of position of the moving lens unit for magnification change. The above equations can be applied to humidity as they are.

Figure 2:
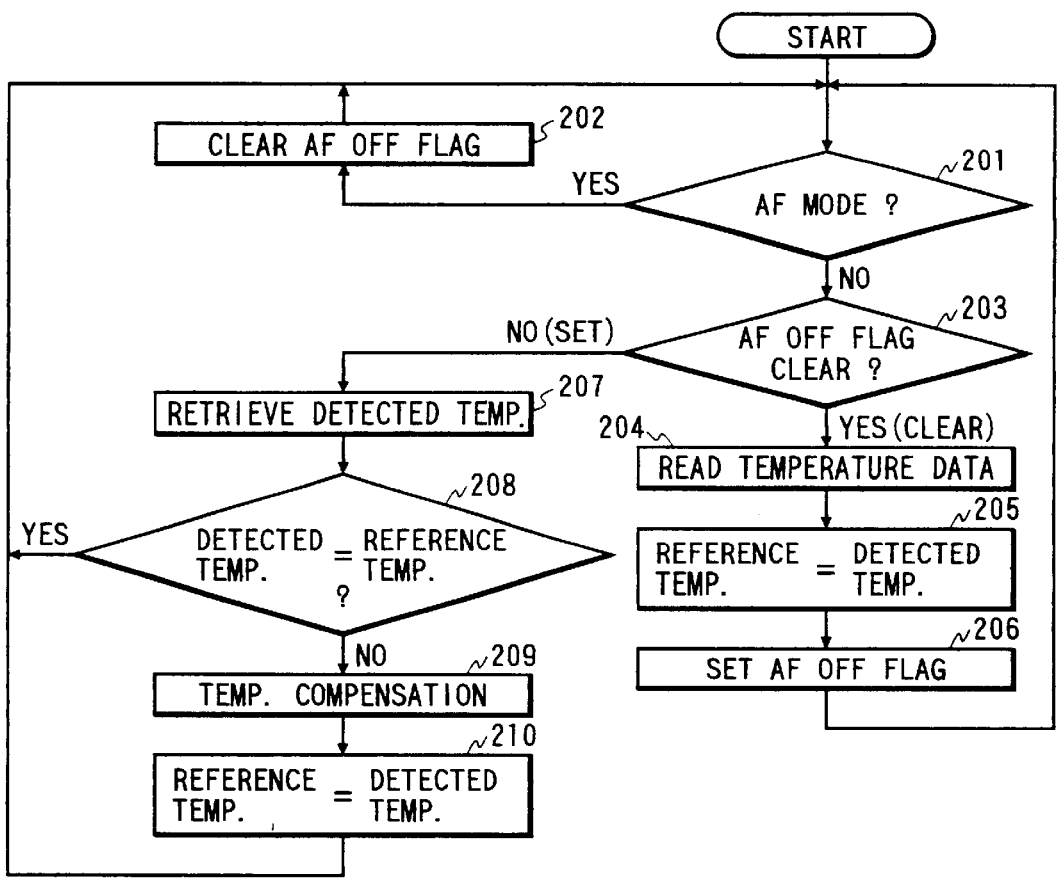
FIG. 2 is a flowchart to show the operation of Embodiment 1 according to the present invention.

The operation of the present embodiment is next explained using the flowchart of FIG. 2.

In FIG. 2, it is determined at step 201 whether the AF function of the AF device 16 is on or off. If it is on then an AF off flag is cleared at step 202 and the flow returns to step 201. If it is off then it is determined at step 203 whether the AF off flag is cleared. If cleared, the detection circuit 13 reads a temperature detection output at step 204, the detected temperature is set as a reference temperature at step 205, and the AF off flag is set at step 206. If the AF off flag is set at step 203, the detection circuit 13 reads a temperature detection output at step 207 and it is determined at step 208 whether the detected temperature is equal to the reference temperature. If they are equal, the flow returns to step 201. If they are different, the temperature change amount $\Delta T$ and correction amount Prr are calculated to perform the temperature compensation control for driving the RR 104 at step 209, and the temperature detected at step 210 is set as a reference temperature. Then the flow returns to step 201.

As described above, the present embodiment is arranged to obtain good image information in such a way that when the operation of the AF device 16 is stopped and if there is an environmental change, the controller 7 drives RR 104, based on the signal from the detection circuit 13, thereby maintaining the in-focus state.

Figure 3:
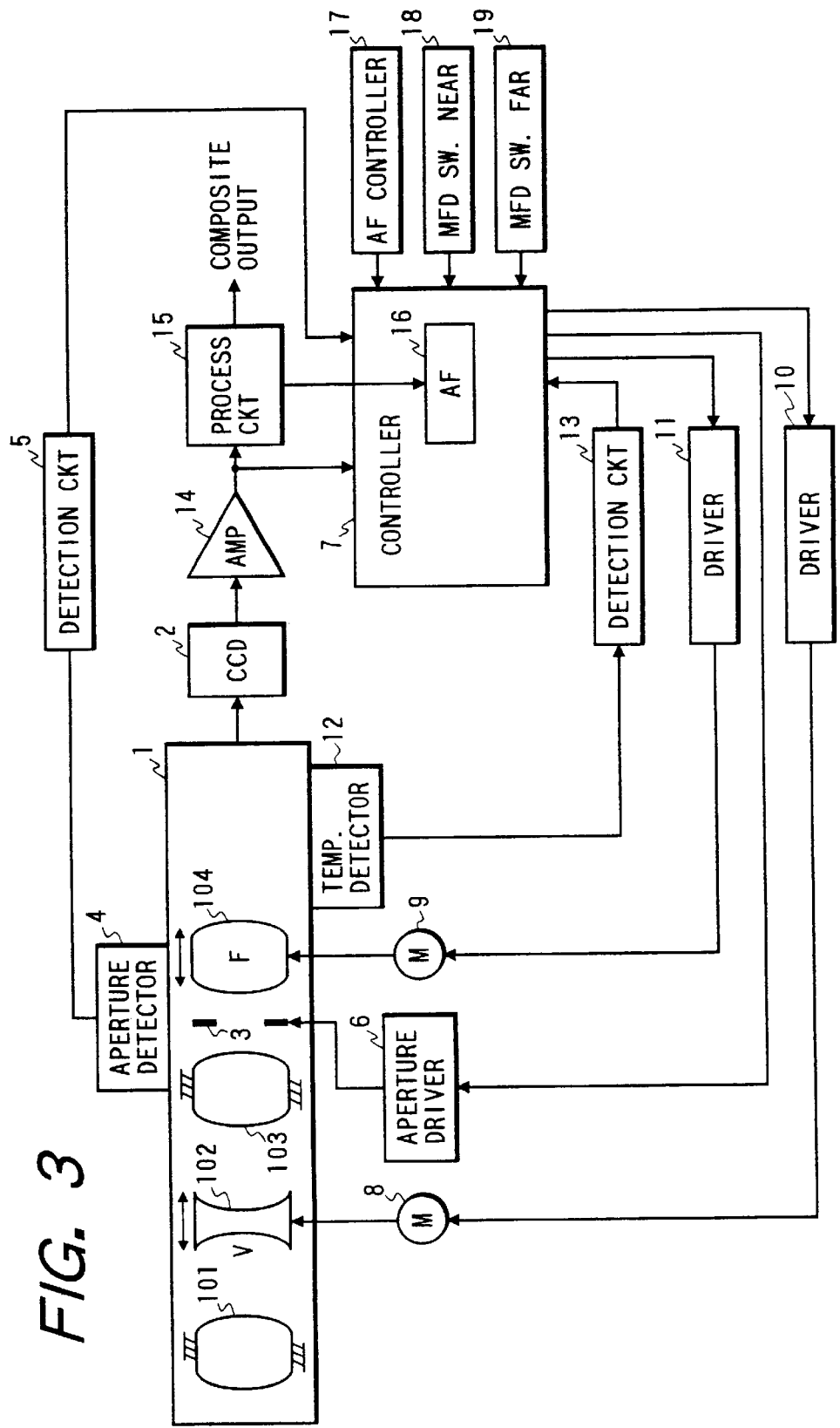
FIG. 3 is a schematic drawing to show the principal part of Embodiment 2 according to the present invention.
Figure 4:
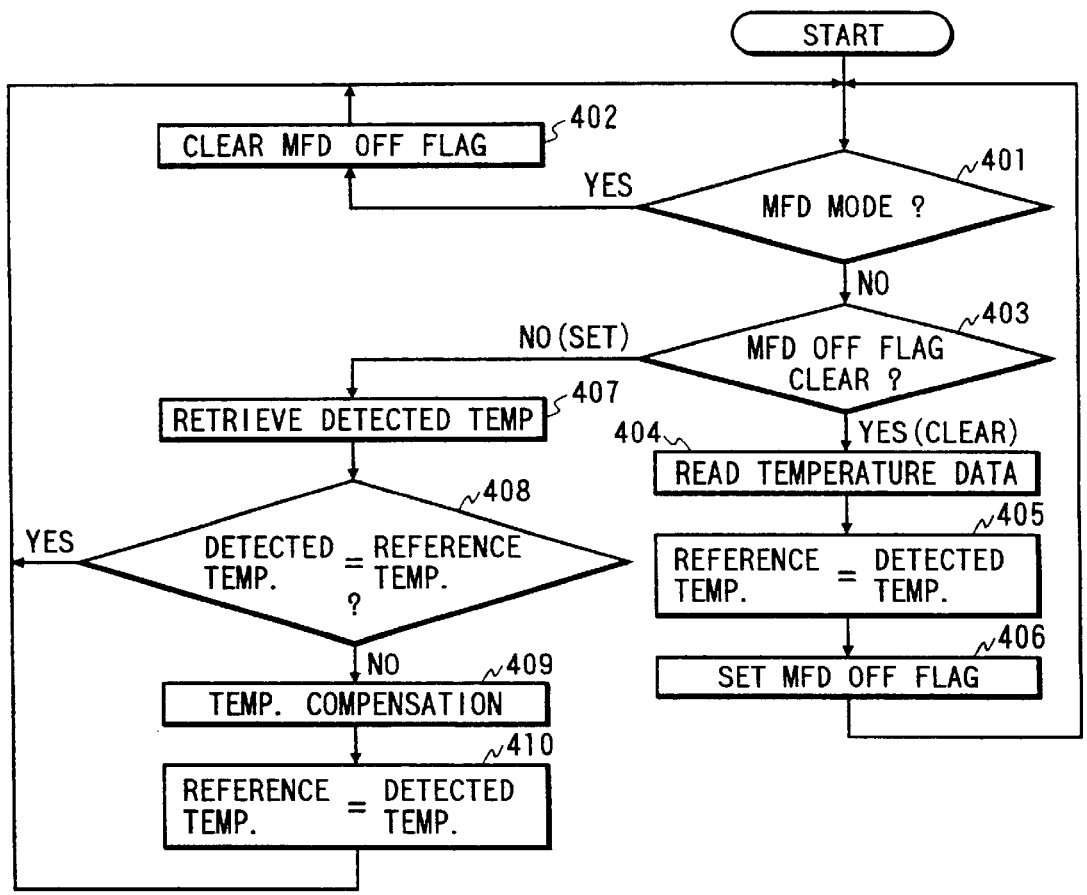
FIG. 4 is a flowchart to show the operation of Embodiment 2 according to the present invention.

FIG. 3 and FIG. 4 are a schematic drawing of the principal part and the flowchart of the operation of Embodiment 2 according to the present invention. In the drawing the same elements as those shown in Embodiment 1 of FIG. 1 are denoted by the same reference numerals.

In the drawing, numerals 18, 19 denote switches for manual focus control device (hereinafter referred to as MFD). With either switch kept in the on state, the switch 18 drives the focus lens 104 to the nearest extreme or the switch 19 drives it to the infinite extreme. The present embodiment is based on the premise of recognition that the focus position at the end of the MFD operation is the in-focus position and that the temperature at the end of the operation is the reference temperature. Therefore, the present embodiment is different from Embodiment 1 only in that when the manual focus control is carried out, the temperature at the end of operation is stored and, based thereon, a temperature change is detected and correction is made, and the other arrangement of the present embodiment is the same as that of Embodiment 1.

The operation of the present embodiment is next explained using the flowchart of FIG. 4.

It is determined at step 401 whether the MFD switch 18 or 19 is on or off. If either one is on, an MFD off flag is cleared at step 402 and then the flow returns to step 401. If they are off, it is determined at step 403 whether the MFD off flag is cleared. If cleared, the temperature detection output is read at step 404, the detected temperature is set as a reference temperature at step 405, and the MFD off flag is set at step 406. If the MFD off flag is set at step 403, the temperature detection output is read at step 407 and it is determined at step 408 whether the detected temperature is equal to the reference temperature. If they are equal, the flow returns to step 401. If they are different, the temperature change amount ΔT and correction amount Prr are calculated to perform the temperature compensation control for driving RR 104 at step 409, the temperature detected is set as a reference temperature at step 410, and then the flow returns to step 401. In the MFD, any means that can detect the operation thereof may be employed without having to be limited to on/off of switch as described.

Figure 5:
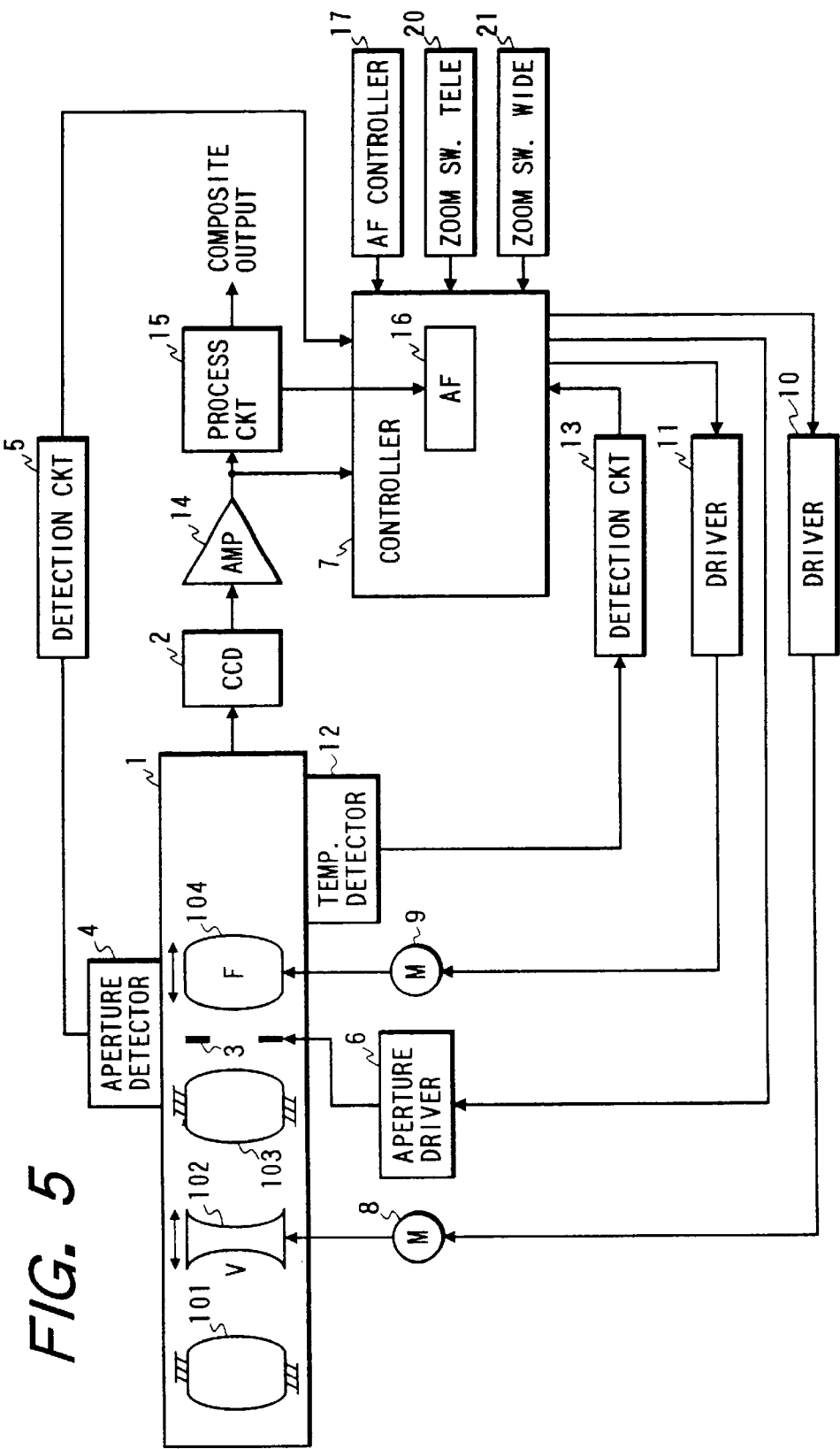
FIG. 5 is a schematic drawing to show the principal part of Embodiment 3 according to the present invention.
Figure 6:
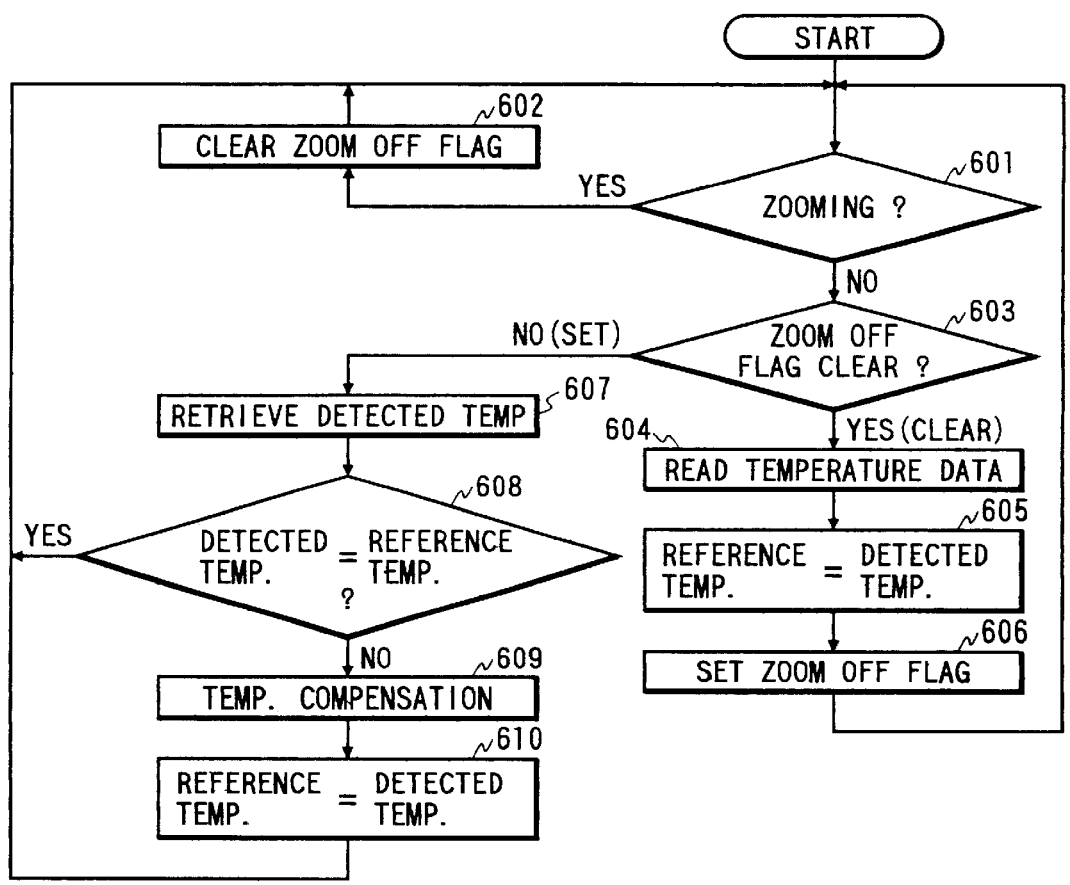
FIG. 6 is a flowchart to show the operation of Embodiment 3 according to the present invention.

FIG. 5 and FIG. 6 are a schematic drawing of the principal part and a flowchart of the operation of Embodiment 3 according to the present invention. In the drawing the same elements as those shown in Embodiment 1 of FIG. 1 are denoted by the same reference numerals.

In the drawing, numerals 20, 21 designate zoom switches. With either switch kept in the on state, the zoom switch 20 drives the variator lens 103 to the telephoto extreme or the zoom switch 21 to the wide angle extreme. The present embodiment is different from Embodiment 1 in that when the view angle is changed by the zoom operation, it is determined that an idle state is broken, the temperature at the end of zoom operation is stored, a temperature change is detected as assuming that the idle state is again established after that, and correction is made based thereon, and the other arrangement of the present embodiment is the same as that of Embodiment 1.

The operation of the present embodiment is next described using the flowchart of FIG. 6.

It is determined at step 601 whether the zoom switch 20 or 21 is on or off. If either one is on, a zoom off flag is cleared at step 602 and the flow returns to step 601. If they are off, it is determined at step 603 whether the zoom off flag is cleared. If cleared, the temperature detection output is read at step 604, the detected temperature is set as a reference temperature at step 605, and the zoom off flag is set at step 606. If the zoom off flag is set at step 603, the temperature detection output is read at step 607 and it is determined at step 608 whether the detected temperature is equal to the reference temperature. If they are equal, the flow returns to step 601. If they are different, the temperature change amount ΔT and correction amount Prr are calculated to perform the temperature compensation control for driving RR 104 at step 609, the detected temperature is set as a reference temperature at step 610, and then the flow returns to step 601. In the present embodiment, the detection of zoom operation may be done by any means that can detect the operation without having to be limited to on/off of switch as described.

As explained above, employment of the configuration of the present embodiment permits good images without defocus to be obtained even with temperature changes during zooming, during the operation of the AF function, or during stop of the AF function, or even with occurrence of deviation from the reference temperature though the temperature has been kept constant.

The present embodiment uses a single temperature detector 12, but it may be modified to use plural detectors, which can achieve better effects.

The present embodiment was described as an example where the environmental changes were the temperature changes, but with humidity changes or pressure changes as environmental changes, the configuration as described above can handle such changes in the same manner as long as the apparatus is provided with a means for detecting such changes. For example, the apparatus may be provided with either a temperature detector or a humidity detector, or the apparatus may be provided with the both detectors and arranged to correct defocus due to the temperature changes and humidity changes.

The embodiments as described above can achieve the optical apparatus suitable for video cameras, silver-salt cameras, electronic still cameras, and so on in such an arrangement that while photography is made with operating the autofocusing function using the optical system (photographing lens) having a moving lens unit to move on the optical axis in order to achieve focus or magnification change, even if there is an environmental change upon stop of the operation of the autofocusing function for some reason, for example, if there is a temperature change or a humidity change, deviation of the image plane can be corrected for by properly setting movement of the moving lens unit, when necessary, according to the environmental change, whereby high optical performance can be maintained.

Figure 7:
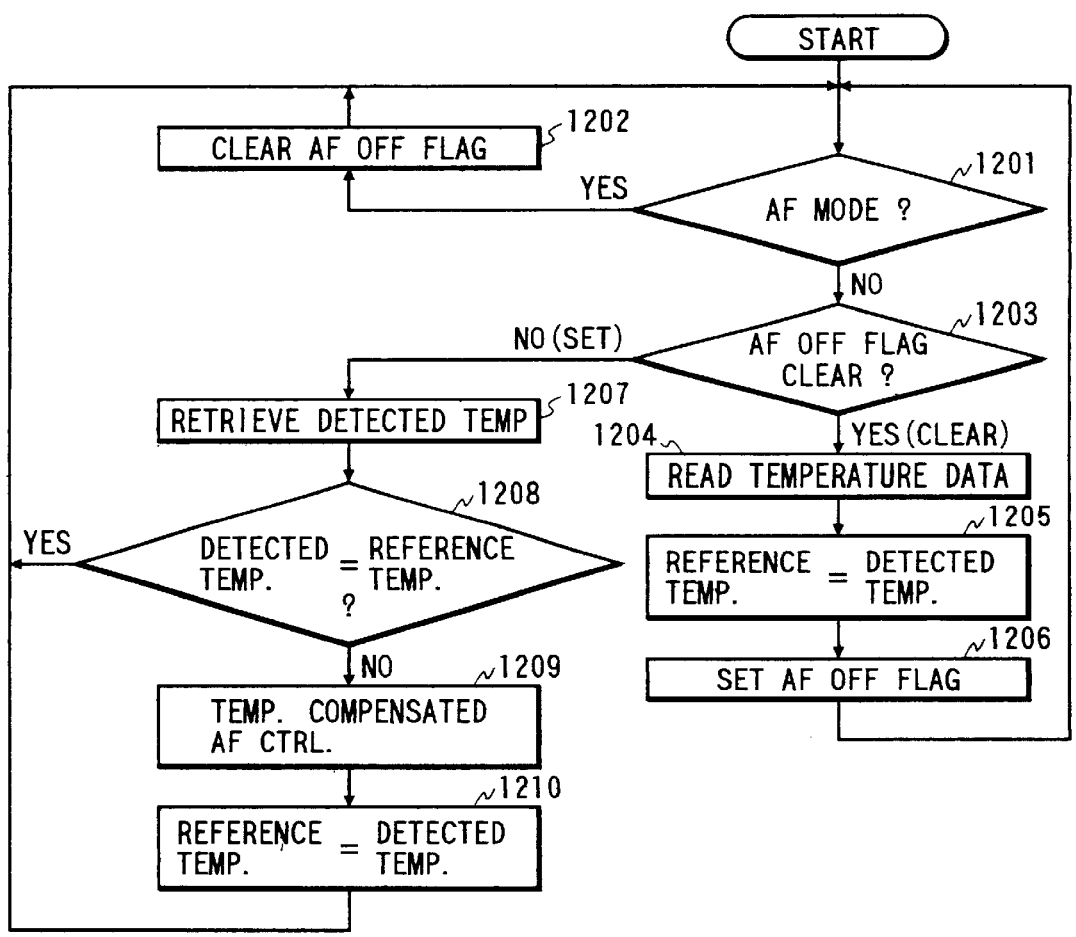
FIG. 7 is a flowchart to show the operation of the optical apparatus as the fourth embodiment.

The fourth embodiment is next described using FIG. 7.

Since the structure itself of the optical apparatus of the fourth embodiment is the same as in FIG. 1, description of the components is omitted herein.

In the fourth embodiment the controller 7 obtains a drive amount of RR 104, based on the in-focus signal from the AF device 16, and outputs a drive control signal to the driver 11. Then the driver 11 drives the lens drive unit 9, based on the drive control signal from the controller 7, to move RR 104 along the direction of the optical axis, thereby effecting AF of RR 104.

Since the optical system 1 of the fourth embodiment employs the plastic lens in at least one lens unit, as discussed previously, occurrence of a temperature change or a humidity change around the plastic lens due to an environmental change will change the shape of the plastic lens and change the refractive index because of the large temperature coefficient of refractive index of the material, as described previously, so as to greatly change the focal length, which inevitably changes the total focal length of the optical system 1. Because of it, if photography is carried out in fixed focus without action of the AF function, the position of the image plane will deviate from that at the reference temperature (for example, 20° C.) with temperature changes, which will cause so-called defocus and which will degrade the optical performance as an optical apparatus for clear photography of object.

In order to cancel the defocus occurring with environmental changes during photography under stop of the AF function and in fixed focus, the fourth embodiment is arranged so that when the AF controller 17 stops (or turns off) the operation (function) of the AF device 16, the detector 12 detects the ambient temperature of the optical system 1, the temperature is stored, and thereafter, if the ambient temperature changes, the function of the AF device 16 is utilized to move the RR 104 to the in-focus position, thereby correcting deviation in the position of the image plane of the optical system due to the change of the ambient temperature.

The following description will concern the deviation of the image plane (defocus) and solving methods of the deviation of the image plane, mainly focusing on the temperature changes as environment changes, but the same solving methods can be applied to the cases where defocus occurs from problems due to the humidity changes.

Specifically describing the correction for variations in the position of the image plane of the optical system in the fourth embodiment, the controller 7 sets the detected temperature obtained from the detector 12 as a reference temperature when the AF controller 17 stops (or turns off) the operation (function) of the AF device 16, and a determining circuit not shown determines whether the detected temperature obtained from the above detector 12 after setting of the reference temperature has a change. If the later detected temperature as a determination object shows a change, the AF device 16 is functioned to control the drive of the lens drive unit 9, based on the in-focus signal of the AF device 16, to move RR 104 to the in-focus position, thereby correcting variation in the position of the image plane of the optical system due to the change of ambient temperature. This can correct the variation in the position of the image plane of the optical system due to the change of ambient temperature, thereby obtaining good image information.

The operation of the fourth embodiment is next explained using the flowchart of FIG. 7. It is determined at step 1201 whether the AF function of the AF device 16 is on or off. If it is on, the AF off flag is cleared at step 1202 and then the flow returns to step 1201. If the AF function is off, it is determined at step 1203 whether the AF off flag is cleared. If it is cleared, the detector 12 reads a temperature detection value at step 1204, the temperature detection value (detected temperature) is set as a reference temperature at step 1205, and the AF off flag is set at step 1206.

If at step 1203 the AF off flag is not cleared, i.e., if it is set, the detector 12 reads a temperature detection value at step 1207 and it is determined at step 1208 whether the temperature detection value (detected temperature) is equal to the reference temperature. If they are equal, the flow returns to step 1201. If they are different, the flow goes to step 1209 to perform temperature compensated AF control to move RR 104 to the in-focus position by the AF function, the reference temperature is updated at step 1210 so that the above detected temperature which was the determination object with respect to the above reference temperature is set as a new reference temperature, and then the flow returns to step 1201.

As described above, the fourth embodiment is arranged in such a manner that when the AF controller 17 stops the operation of the AF device 16, the detected temperature obtained from the detector 12 is set as a reference temperature and that if the detected temperature obtained from the detector 12 varies from the reference temperature, the controller performs the temperature compensated AF control for moving the RR 104 to the in-focus position utilizing the function of the AF device 16, thereby achieving good image information.

Figure 8:
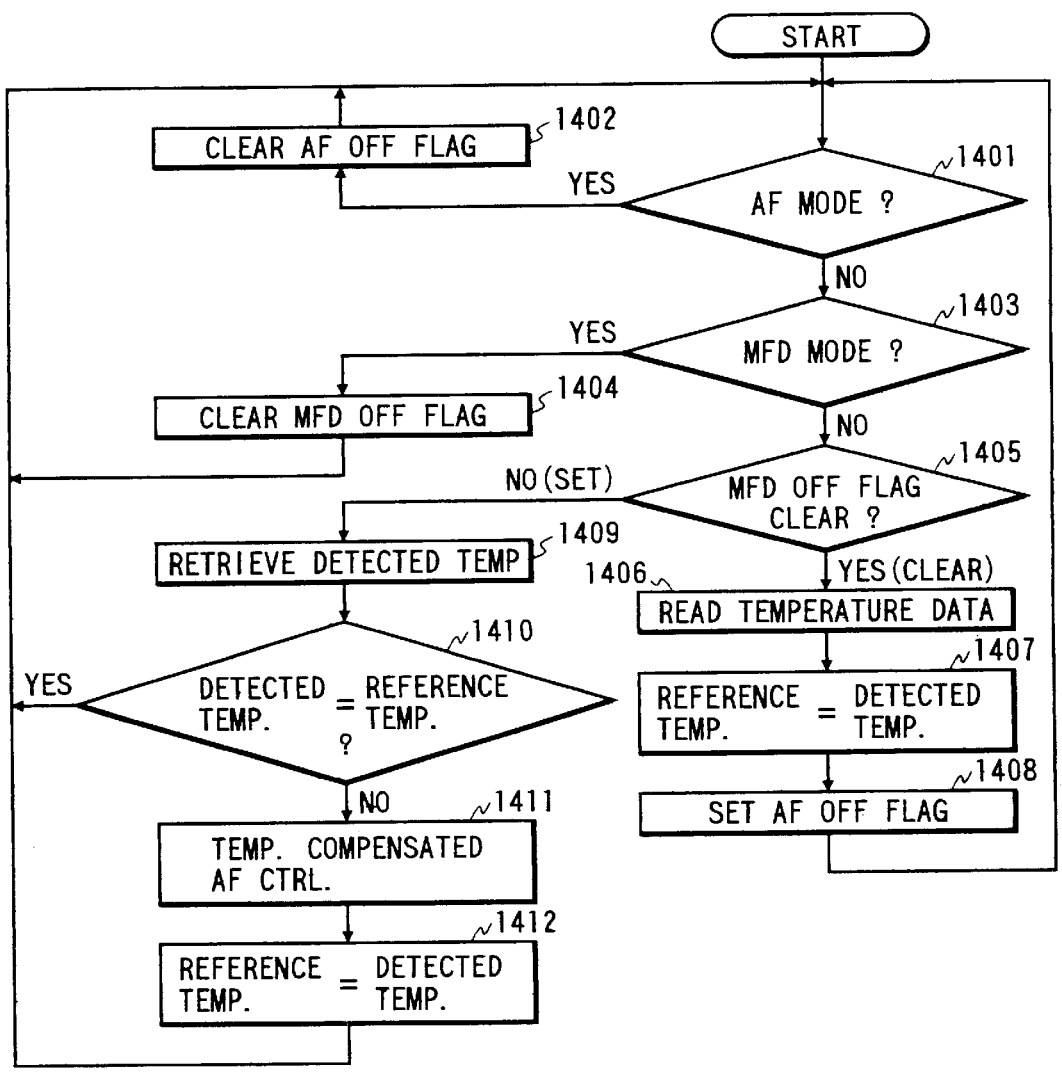
FIG. 8 is a flowchart to show the operation of the optical apparatus as the fifth embodiment.

The optical apparatus of the fifth embodiment shown in FIG. 8 is provided with the manual focus adjusting devices 18, 19 for manually driving the lens drive unit 9 through the controller 7 to move RR 104, thereby effecting manual focusing operation, and thus has the same arrangement as the optical apparatus of the second embodiment. Since the configuration of the present embodiment is the same as that of FIG. 3, description of the individual components is omitted herein.

The fifth embodiment is based on the premise that the focus position at the end of the MFD operation is the in-focus position and that the ambient temperature at the end of the operation of RR 104 is set as a reference temperature. Namely, when the manual focus adjustment is carried out during stop of the operation of the AF device 16 by the AF controller 17, the ambient temperature is stored during stop of the operation of RR 104 or at the end of the operation of RR 104. When the ambient temperature of the optical system 1 changes after that, the function of the AF device 16 is utilized to move RR 104 to the in-focus position, thereby correcting variation in the position of the image plane of the optical system due to the change of environment information.

Specifically, the controller 7 sets the detected temperature obtained from the detector 12 as a reference temperature during stop of the operation of the AF device 16 by the AF controller 17 and upon stop of the operation of RR 104 by the manual focusing switch 18, 19 or at the time of end of the operation of RR 104 by the manual focusing switch 18, 19, and a determining circuit not shown determines whether the detected temperature obtained from the above detector 12 after setting of the reference temperature has a change. When the later detected temperature as a determination object has a change, the AF device 16 is functioned to control the drive of the lens drive unit 9, based on the in-focus signal of the AF device 16, to move RR 104 to the in-focus position, thereby correcting the variation in the position of the image plane of the optical system due to the change of ambient temperature. This can correct the variation in the position of the image plane of the optical system due to the change of ambient temperature, thereby obtaining good image information.

The operation of the fifth embodiment is next explained using the flowchart of FIG. 8. It is determined at step 1401 whether the AF function of the AF device 16 is on or off. If it is on, the AF off flag is cleared at step 1402 and the flow returns to step 1401. If the AF function is off, it is determined at step 1403 whether the MFD switch 18 or 19 is on. If either one is on, the MFD off flag is cleared at step 1404 and the flow returns to step 1401. If they are off, it is determined at step 1405 whether the MFD off flag is cleared. If cleared, a temperature detection value is read at step 1406, the temperature detection value (detected temperature) is set as a reference temperature at step 1407, and the MFD off flag is set at step 1408.

If at step 1405 the MFD off flag is not cleared, i.e., if it is set, a temperature detection value is read at step 1409 and it is determined at step 1410 whether the temperature detection value (detected temperature) is equal to the reference temperature. If they are equal, the flow returns to step 1401. If they are different, step 1411 is carried out to perform the temperature compensated AF control for moving RR 104 to the in-focus position by the AF function, and then step 1412 is carried out to update the reference temperature by setting the above detected temperature, which was the determination object with respect to the above reference temperature, as a new reference temperature. Then the flow returns to step 1401.

As described above, the fifth embodiment is arranged in such a way that in the stop state of the operation of the AF device 16 by the AF controller 17 and upon stop of the operation of RR 104 by the manual focusing switch 18, 19 or at the time of end of the operation of RR 104, the detected temperature obtained from the detector 12 is set as a reference temperature and that when the detected temperature obtained from the detector 12 changes relative to the reference temperature, the function of the AF device 16 is utilized to move RR 104 to the in-focus position so as to effect the temperature compensated AF control, thereby obtaining good image information.

The manual focusing devices 18, 19 may be any means that can detect the operation such as on/off without having to be limited to on/off of the switches described above.

Figure 9:
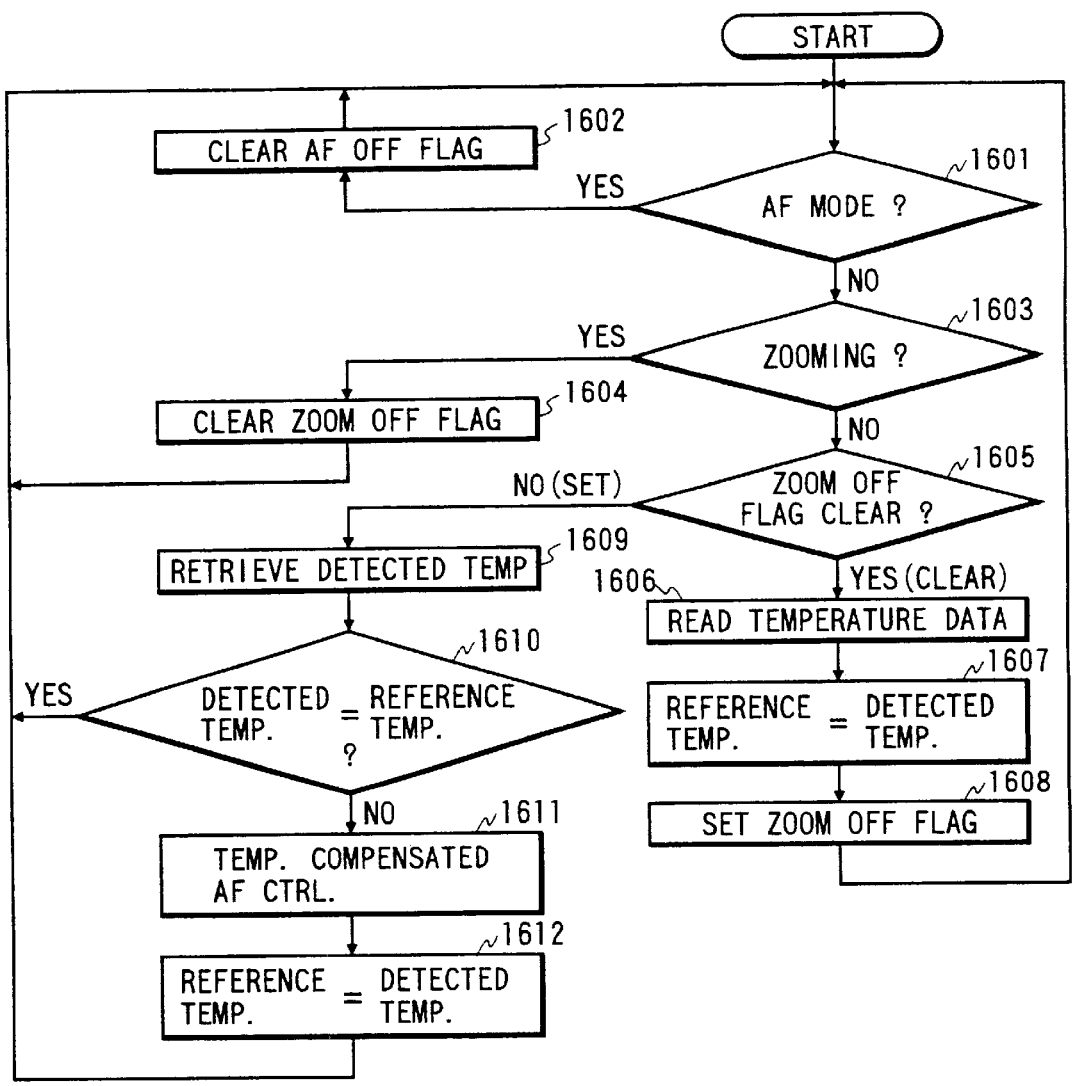
FIG. 9 is a flowchart to show the operation of the optical apparatus as the sixth embodiment.

The optical apparatus of the sixth embodiment shown in FIG. 9 is arranged to have the manual zooming devices 20, 21 for manually achieving drive of the lens drive unit 8 through the controller 7 to effect zooming of the variator lens 102, and thus has the same arrangement as the optical apparatus of the third embodiment. Since the configuration of the present embodiment is the same as that of FIG. 5, description of the individual components is omitted herein.

The sixth embodiment is arranged so that in the stop state of the operation of the AF device 16 by the AF controller 17 and when the view angle is changed by the zooming operation through the manual zooming switch 20, 21, it is determined that the idle state for photography after idle is broken, the ambient temperature is stored at the end of the zooming operation by the manual zooming switch 20, 21, it is assumed thereafter that the idle state is again established, and when the ambient temperature of the optical system 1 changes in such an idle state, the function of the AF device 16 is utilized to move RR 104 to the in-focus position, thereby correcting the variation in the position of the image plane of the optical system due to the change of ambient temperature.

Specifically, in the stop state of the operation of the AF device 16 by the AF controller 17 and upon completion of the zooming operation of the variator lens 102 by the manual zooming device 20, 21, the controller 7 sets the detected temperature obtained from the detector 12 as a reference temperature, and a determining circuit not shown determines whether a detected temperature obtained from the above detector 12 after setting of the reference temperature has a change. When the later detected temperature as a determination object has a change, the AF device 16 is functioned to control the drive of the lens drive unit 9, based on the in-focus signal from the AF device 16 so as to move RR 104 to the in-focus position, thereby correcting the variation in the position of the image plane of the optical system due to the change of ambient temperature. This can correct the variation in the position of the image plane of the optical system due to the change of ambient temperature, thereby obtaining good image information.

The operation of the sixth embodiment is next explained using the flowchart of FIG. 9. It is determined at step 1601 whether the AF function of the AF device 16 is on or off. If it is on, the AF off flag is cleared at step 1602 and the flow returns to step 1601. If the AF function is off, it is determined at step 1603 whether the zoom switch 20 or 21 is on or off. If either one is on, the zoom off flag is cleared at step 1604 and then the flow returns to 1601. If they are off, it is determined at step 1605 whether the zoom off flag is cleared. If it is cleared, a temperature detection value is read at step 1606, the temperature detection value (detected temperature) is set as a reference temperature at step 1607, and the zoom off flag is set at step 1608.

If at step 1605 the zoom off flag is not cleared, that is, if it is set, a temperature detection value is read at step 1609, and it is determined at step 1610 whether the temperature detection value (detected temperature) is equal to the reference temperature. If they are equal, the flow returns to step 1601. If they are different, step 1611 is carried out to effect the temperature compensated AF control for moving RR 104 to the in-focus position by the AF function and then step 1612 is carried out to set the above detected temperature as a reference temperature. Then the flow returns to step 1601.

As described above, the sixth embodiment is arranged in such a way that in the stop state of the operation of the AF device 16 by the AF controller 17 and at the end of the zooming operation by the manual zooming device 20, 21, the detected temperature obtained from the detector 12 is set as a reference temperature and that when the detected temperature obtained from the detector 12 changes with respect to the reference temperature, the function of the AF device 16 is utilized to move RR 104 to the in-focus position so as to effect the temperature compensated AF control, thereby obtaining good image information.

The manual zooming devices 20, 21 may be any means that can detect the operation such as on/off, without having to be limited to on/off of the switches described above.

Figure 10:
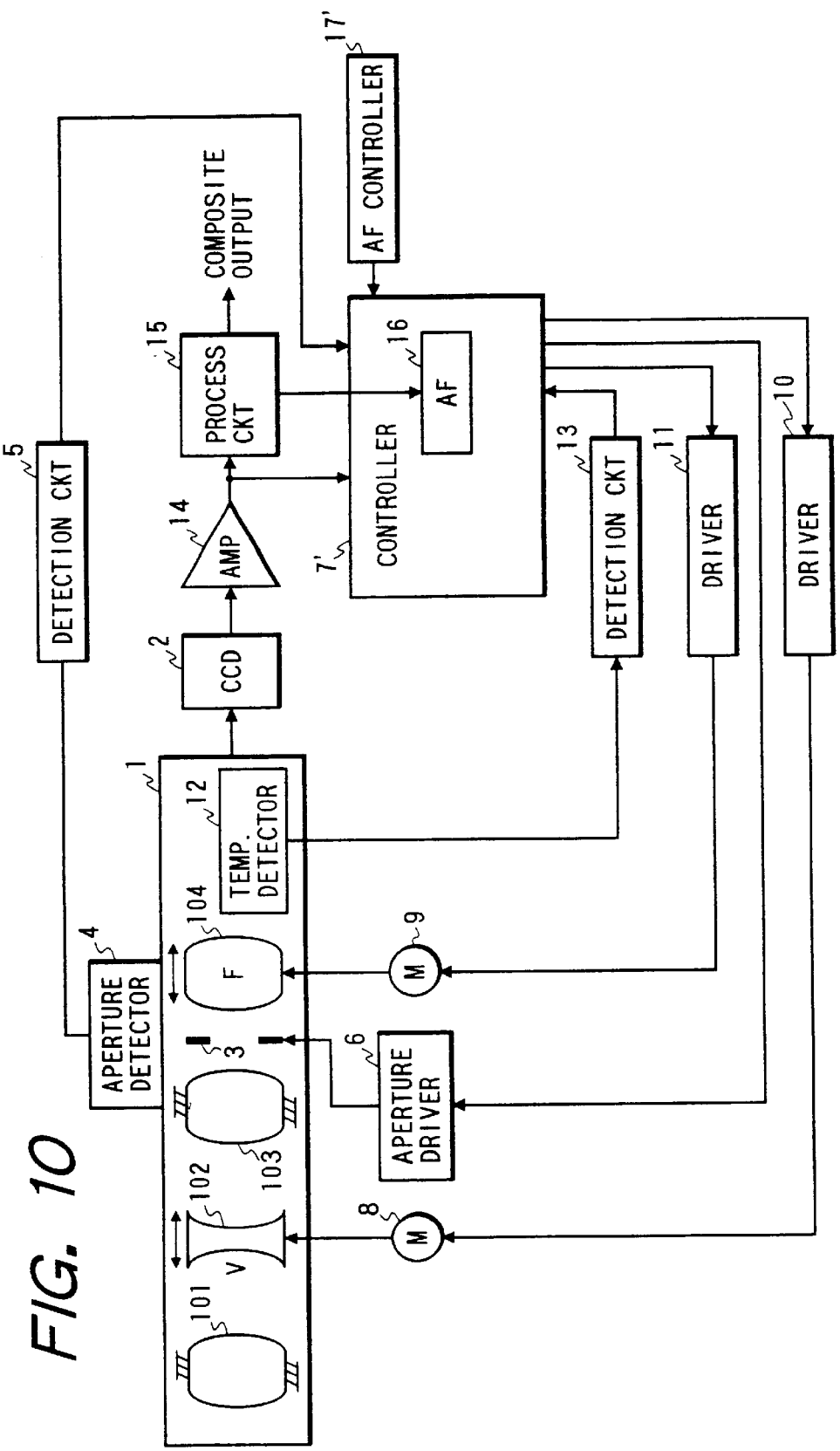
FIG. 10 is a cross-sectional view of the principal part to show the seventh embodiment of the optical apparatus according to the present invention.
Figure 11:
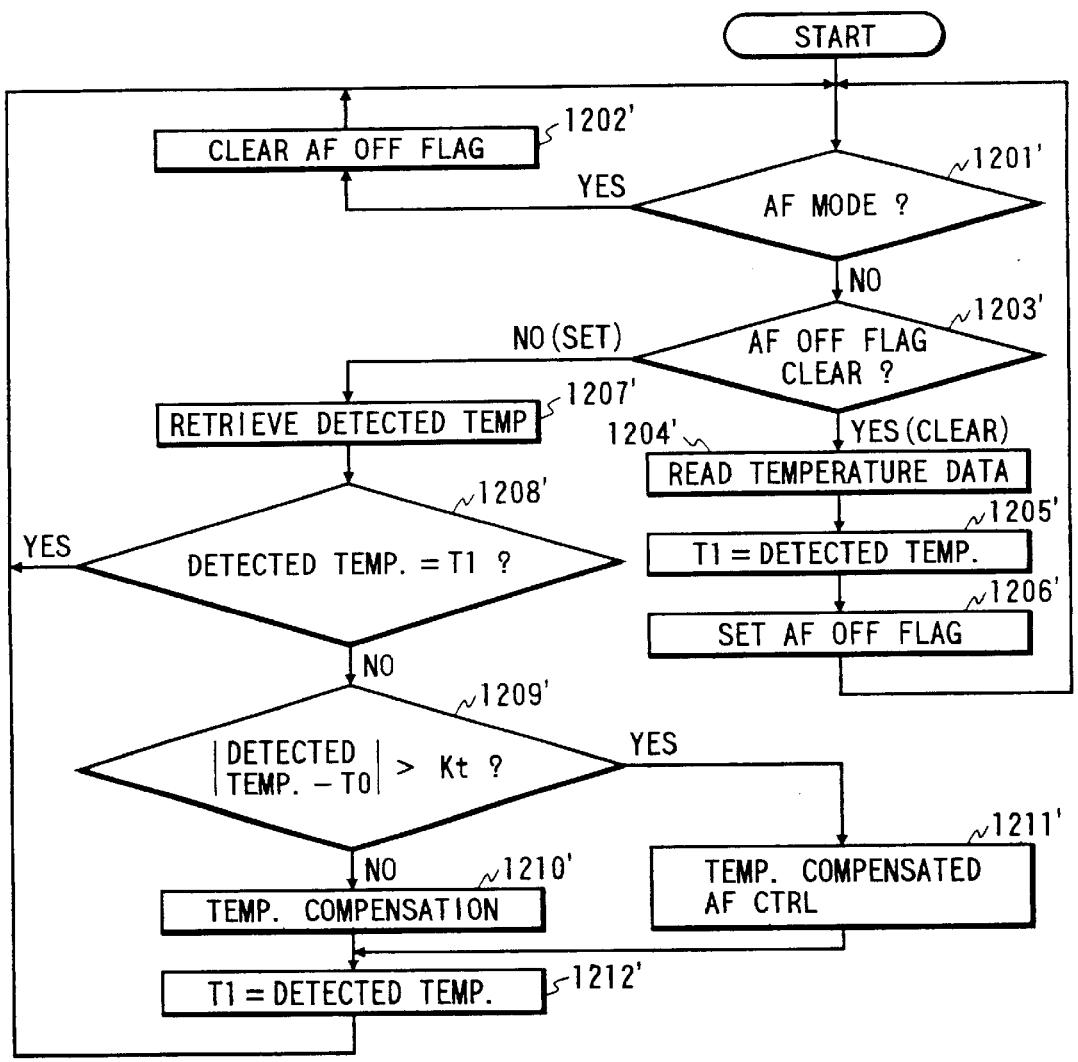
FIG. 11 is a flowchart to show the operation of the optical apparatus shown in FIG. 10.

The optical apparatus of the seventh embodiment shown in FIG. 10 and FIG. 11 is constructed in the same structure as the optical apparatus of the first embodiment except for the controller 7'. In more detail, the optical apparatus of the seventh embodiment is provided with such a temperature compensated control function that a memory portion (memory means) not shown of the controller 7' for controlling the whole of the optical apparatus stores position data of the moving lens unit (RR lens) 104 at a reference temperature TO (reference ambient temperature) (which is set at 20° C. in the seventh embodiment) described hereinafter, and control information including plural temperature compensation coefficient data Trr per unit temperature for correcting this position data based on an ambient temperature (detected temperature) from the detector 12, that the above temperature correction coefficient data Trr is multiplied by a temperature change value $\Delta T$, which is an absolute value of a difference between the detected temperature from the detector 12 and the above reference temperature, to obtain correction amount data (temperature corrected position data) Prr for correction for variations in the position of the image plane due to changes of ambient temperature of the optical system, and that the lens drive unit 9 moves RR 104 along the direction of the optical axis by this correction amount Prr.

The following equations represent the relation among the temperature change value $\Delta T$, focus movement amount Trr, and correction amount Prr in such a temperature compensated control function.

$$\Delta T = |\text{detected temperature} - \text{reference ambient temperature}|$$
$$Prr = \Delta T \times Trr$$

Here, the temperature correction coefficient data Trr is defined as a function of position of the moving lens unit for magnification change. The above equations can be applied to humidity changes as they are.

In the seventh embodiment, when the operation (function) of the AF device 16 is stopped (or turned off) by the AF controller 17, the ambient temperature of the optical system 1 is detected by the detector 12 and then is stored, and it is determined whether a temperature change value $\Delta T$ of a difference between a latest detected temperature obtained from the detector 12 after the foregoing ambient temperature and the reference temperature is more than a predetermined, specific value Kt described hereinafter. If the temperature change value $\Delta T$ is not more than the specific value Kt, the correction amount (temperature corrected position data) Prr is obtained from the above relation, and the lens drive unit 9 moves RR 104 to correct variation in the position of the image plane of the optical system due to the change of ambient temperature. On the other hand, if the above temperature change value $\Delta T$ is more than the specific value Kt, the above function of the AF device 16 is utilized to move RR 104 to the in-focus position, thereby correcting the variation in the position of the image plane of the optical system due to the change of ambient temperature.

Specifically, the controller 7' stores the detected temperature obtained from the detector 12 when the operation (function) of the AF means 16 is stopped (or turned off) by the AF controller 17. Then the controller 7' calculates the temperature change value $\Delta T$ of the difference between the latest detected temperature obtained from the detector 12 after the previously detected temperature and the reference temperature and determines whether the absolute value of this temperature change value $\Delta T$ is more than the predetermined, specific value Kt. If the absolute value of the temperature change value $\Delta T$ is not more than the predetermined, specific value Kt, the controller obtains the correction amount (temperature corrected position data) Prr from the foregoing relation and moves RR 104 by the lens drive unit 9, based thereon, thereby correcting the variation in the position of the image plane of the optical system due to the change of ambient temperature. On the other hand, if the absolute value of the temperature change value $\Delta T$ is more than the specific value Kt, the above AF device 16, is functioned to control the drive of the lens drive unit 9, based on the in-focus signal of the AF device 16, to move RR 104 to the in-focus position, thereby correcting the variation in the position of the image plane of the optical system due to the change of ambient temperature. This can correct the variation in the position of the image plane of the optical system due to the change of ambient temperature, thereby obtaining good image information.

The operation of the seventh embodiment is next explained using the flowchart of FIG. 11. It is determined at step 1201' whether the AF function of the AF device 16 is on or off. If it is on, the AF off flag is cleared at step 1202' and then the flow returns to step 1201'. If the AF function is off, it is determined at step 1203' whether the AF off flag is cleared. If cleared, the temperature detection value is read by the detector 12 at step 1204', the temperature detection value (detected temperature) is set as a detected temperature T1 in the MF (manual focus) mode at step 1205', and then the AF off flag is set at step 1206'.

If at step 1203' the AF off flag is not cleared, that is, if it is set, a temperature detection value is read by the detector 12 at step 1207', and it is determined at step 1208' whether the temperature detection value (detected temperature) is equal to the previous detected temperature T1. If they are equal, the flow returns to step 1201'. If they are different, step 1209' is carried out to obtain a temperature change value $\Delta T$ of a difference between the later detected temperature obtained at step 1207' and the reference temperature T0 and to determine if the absolute value thereof is more than the predetermined, specific value Kt. If the temperature change value $\Delta T$ is not more than the specific value Kt, step 1210' is carried out to obtain the correction amount Prr from the above relation and to move RR 104, thereby effecting the temperature compensated control for correcting the variation in the position of the image plane of the optical system. On the other hand, if at step 1209' the absolute value of the temperature change value $\Delta T$ is more than the specific value Kt, step 1211' is carried out to execute the temperature compensated AF control to move RR 104 to the in-focus position by the AF function. Then step 1212' is carried out to update the previously detected temperature T1 to the later detected temperature. Then the flow returns to step 1201'.

As described above, the seventh embodiment is arranged in such a way that when the operation of the AF device 16 is stopped by the AF controller 17' and if the temperature change value $\Delta T$ of the difference between the latest detected temperature obtained from the detector 12 and the reference temperature is not more than the predetermined, specific value Kt, the controller executes the temperature compensated control to obtain the correction amount Prr of RR 104, to move RR 104 by the lens drive unit 9, and to correct the variation in the position of the image plane of the optical system and that, on the other hand, if the absolute value of the temperature change value $\Delta T$ is more than the specific value Kt, the controller executes the temperature compensated AF control to move RR 104 to the in-focus position utilizing the function of the AF device 16, thereby achieving good image information.

There is no specific limitation on the reference temperature T0 in the seventh embodiment. For example, it may be a temperature upon execution of lens adjustment or a reference value being an absolute value of a desired temperature. It is, however, preferred to determine the reference temperature at an approximate value to ambient temperatures at which the optical apparatus is actually used, because it causes little error in arithmetic processing.

The specific value Kt for determining whether the AF function is to be actuated may be determined arbitrarily depending upon optical characteristics of the optical system, material characteristics, specifications of the optical apparatus, and so on. In addition, the specific value may be arranged to be stored in a rewritable memory unit so as to be changed any time with necessity.

Figure 12:
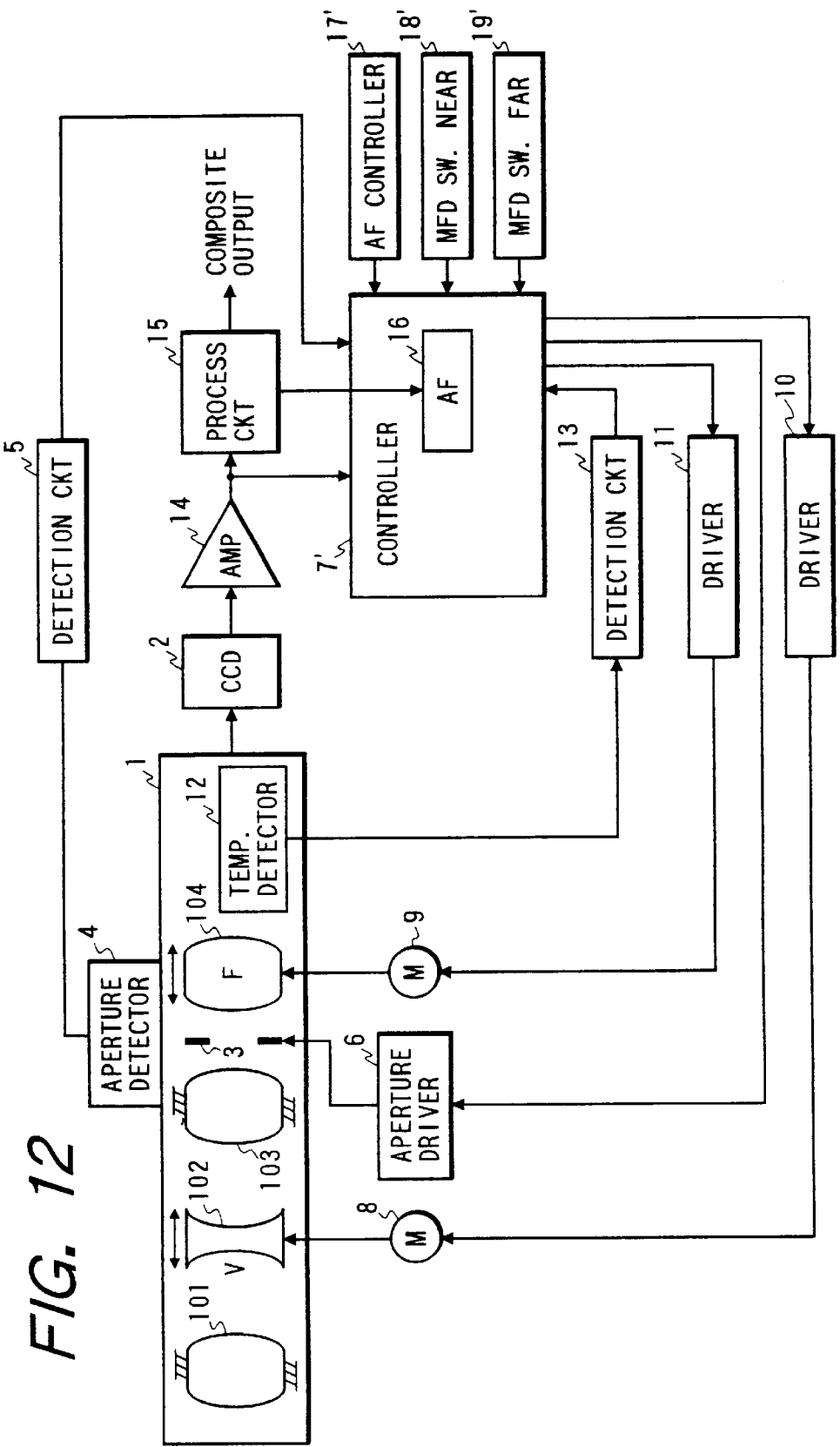
FIG. 12 is a cross-sectional view of the principal part to show the eighth embodiment of the optical apparatus according to the present invention.
Figure 13:
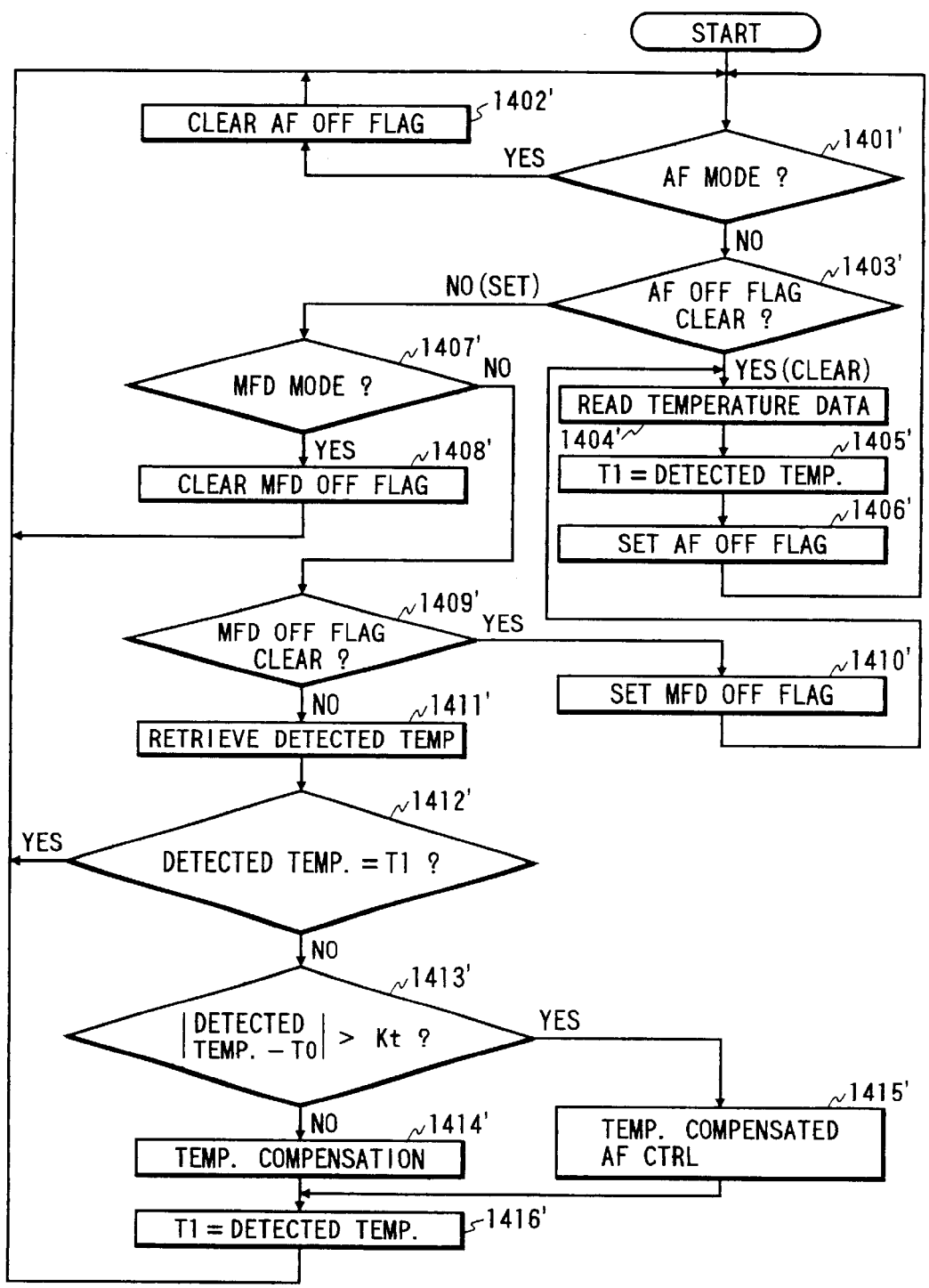
FIG. 13 is a flowchart to show the operation of the optical apparatus shown in FIG. 12.

The optical apparatus of the eighth embodiment shown in FIG. 12 and FIG. 13 is constructed in the same structure as the optical apparatus of the seventh embodiment except for provision of the manual focusing devices 18', 19' for focusing RR 104 by manually driving the lens drive unit 9 through the controller 7'.

In FIG. 12, numerals 18', 19' denote switches for manual focus adjustment (hereinafter referred to as MFD). With either switch kept in the on state, the switch 18' drives RR 104 to the nearest extreme or the switch 19' drives RR 104 to the infinite extreme.

The eighth embodiment is based on the premise that the focus position at the end of the MFD operation is the in-focus position and that the ambient temperature at the end 6f the operation of RR 104 is detected as a reference temperature. In more detail, while the operation of the AF device 16 is stopped by the AF controller 17' and when the manual focusing is carried out, the controller stores an ambient temperature upon stop of the operation of RR 104 or at the end of the operation of RR 104 and then determines whether a temperature change value ΔT of a difference between a latest detected temperature obtained from the detector 12 after the ambient temperature and the reference temperature is more than a predetermined, specific value Kt described below. If the temperature change value ΔT is not more than the predetermined, specific value Kt, the controller obtains the correction value (temperature corrected position data) Prr from the above relation and to move RR 104 by the lens drive unit 9, thereby correcting the variation in the position of the image plane of the optical system due to the change of ambient temperature. On the other hand, if the above temperature change value ΔT is more than the specific value Kt, the controller moves RR 104 to the in-focus position utilizing the function of the above AF device 16, thereby correcting the variation in the position of the image plane of the optical system due to the change of ambient temperature.

Specifically, while the operation of the AF device 16 is stopped by the AF controller 17' and upon stop of the operation of RR 104 by the manual focusing switch 18', 19' or at the time of end of operation of RR 104 by the manual focusing switch 18', 19', the controller 7' stores the detected temperature obtained from the detector 12 and calculates the temperature change value ΔT of the difference between the latest detected temperature obtained from the detector 12 after the previously detected temperature and the reference temperature, and a determining circuit not shown determines whether the absolute value of this temperature change value ΔT is more than the predetermined, specific value Kt. If the absolute value of the temperature change value ΔT is not more than the predetermined, specific value Kt, the controller obtains the correction amount (temperature corrected position data) Prr from the foregoing relation and to move RR 104 by the lens drive unit 9, thereby correcting the variation in the position of the image plane of the optical system due to the change of ambient temperature. On the other hand, if the absolute value of the temperature change value ΔT is more than the specific value Kt, the above AF device 16 is functioned to control the drive of the lens drive unit 9, based on the in-focus signal of the AF device 16, to move RR 104 to the in-focus position, thereby correcting the variation in the position of the image plane of the optical system due to the change of ambient temperature. This can compensate for the variation in the position of the image plane of the optical system due to the change of ambient temperature, thereby attaining good image information.

The operation of the eighth embodiment is next explained using the flowchart of FIG. 13. It is determined at step 1401' whether the AF function of the AF device 16 is on or off. If it is on, the AF off flag is cleared at step 1402' and then the flow returns to step 1401'. If the AF function is off, it is determined at step 1403' if the AF off flag is cleared. If cleared, step 1404' is carried out to read a temperature detection value by the detector 12 and then step 14051 is carried out to set the temperature detection value (detected temperature) as a detected temperature T1 in the MF (manual focus) mode. Then step 1206' is carried out to set the AF off flag.

If at step 1403' the AF off flag is not cleared, that is, if it is set, it is determined at step 1407' whether the switch 18' or 19' of MFD is on or off at step 1407'. If either one is on, the MFD off flag is cleared at step 1408' and then the flow returns to step 1401'. If they are off, it is determined at step 1409' whether the MFD off flag is cleared. If it is cleared, the MFD off flag is set at step 1410', a temperature detection value is read at step 1404', and the processes including step 1405' and the subsequent processes are carried out.

If at step 1409' the MFD off flag is not cleared, that is, if it is set, a temperature detection value is read at step 1411' and it is determined at step 1412' whether the temperature detection value (detected temperature) is equal to the previously detected temperature T1. If they are equal, the flow returns to step 1401'. If they are different, step 1413' is carried out to obtain the temperature change value ΔT of the difference between the later detected temperature obtained at step 1411' and the reference temperature T0 and to determine if the absolute value thereof is more than the predetermined, specific value Kt. If the temperature change value ΔT is not more than the specific value Kt, step 1414' is carried out to execute the temperature compensated control to obtain the correction amount Prr from the foregoing relation and to move RR 104, thereby correcting the variation in the position of the image plane of the optical system. On the other hand, if at step 1413' the absolute value of the temperature change value ΔT is more than the specific value Kt, step 1415' is carried out to execute the temperature compensated AF control to move RR 104 to the in-focus position by the AF function and then step 1416' is carried out to update the previously detected temperature T1 to the later detected temperature. Then the flow returns to step 1401'.

As described above, the eighth embodiment is arranged in such a way that while the operation of the AF device 16 is stopped by the AF controller 17' and upon stop of the operation of RR 104 by the manual focusing switch 18', 19' or at the end of the operation of RR 104, if the temperature change value ΔT of the difference between the latest detected temperature obtained from the detector 12 and the reference temperature is not more than the predetermined, specific value Kt, the controller executes the temperature compensated control to obtain the correction amount Prr of RR 104 and move RR 104 by the lens drive unit 9 so as to compensate for the variation in the position of the image plane of the optical system and that, on the other hand, if the absolute value of the temperature change value ΔT is more than the specific value Kt, the controller executes the temperature compensated AF control to move RR 104 to the in-focus position utilizing the function of the above AF device 16, thereby obtaining good image information.

The manual focusing devices 18', 19' may be any means that can detect the operation such as on/off, without having to be limited to on/off of switch as described above.

Figure 14:
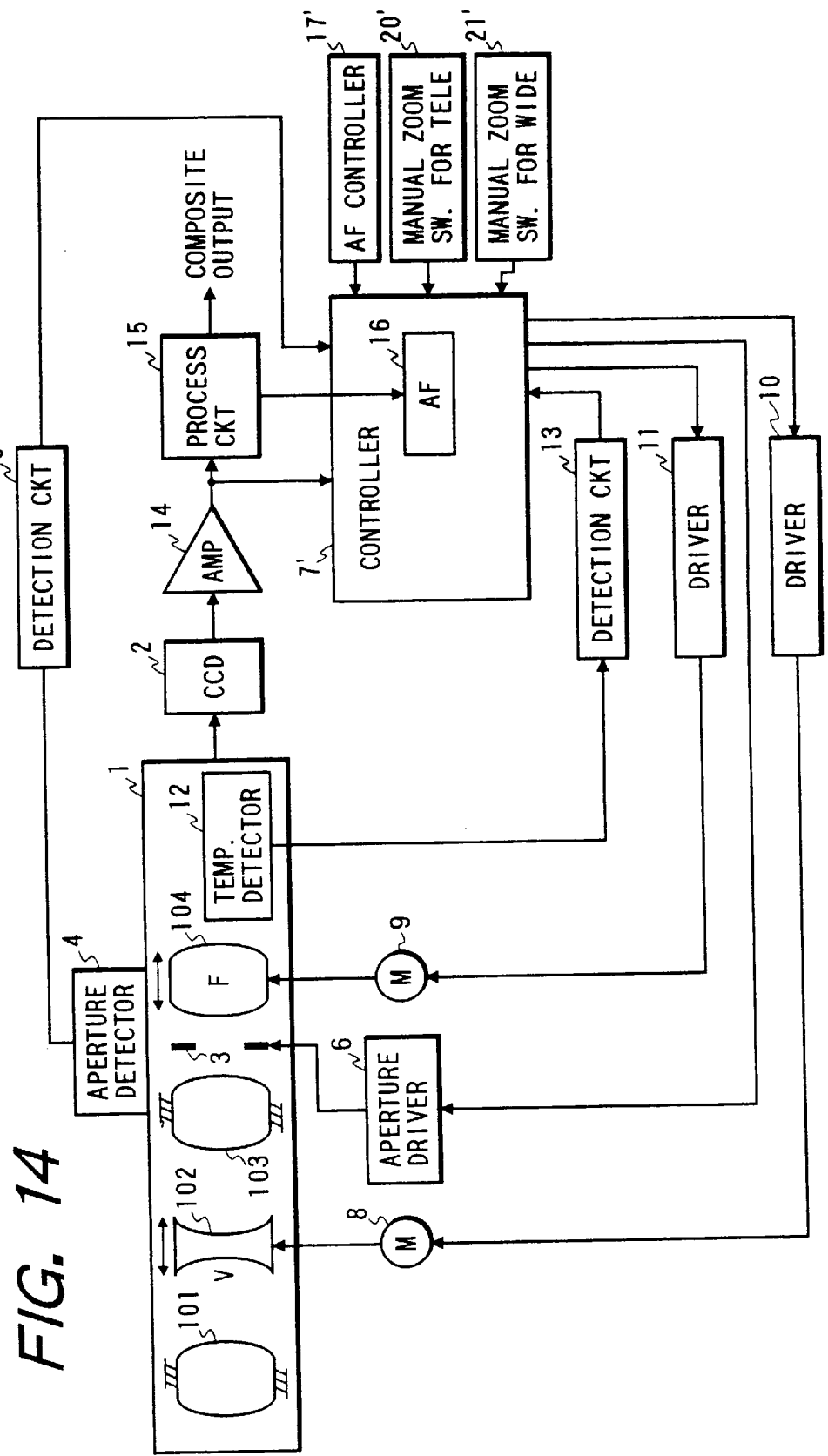
FIG. 14 is a cross-sectional view of the principal part to show the ninth embodiment of the optical apparatus according to the present invention.
Figure 15:
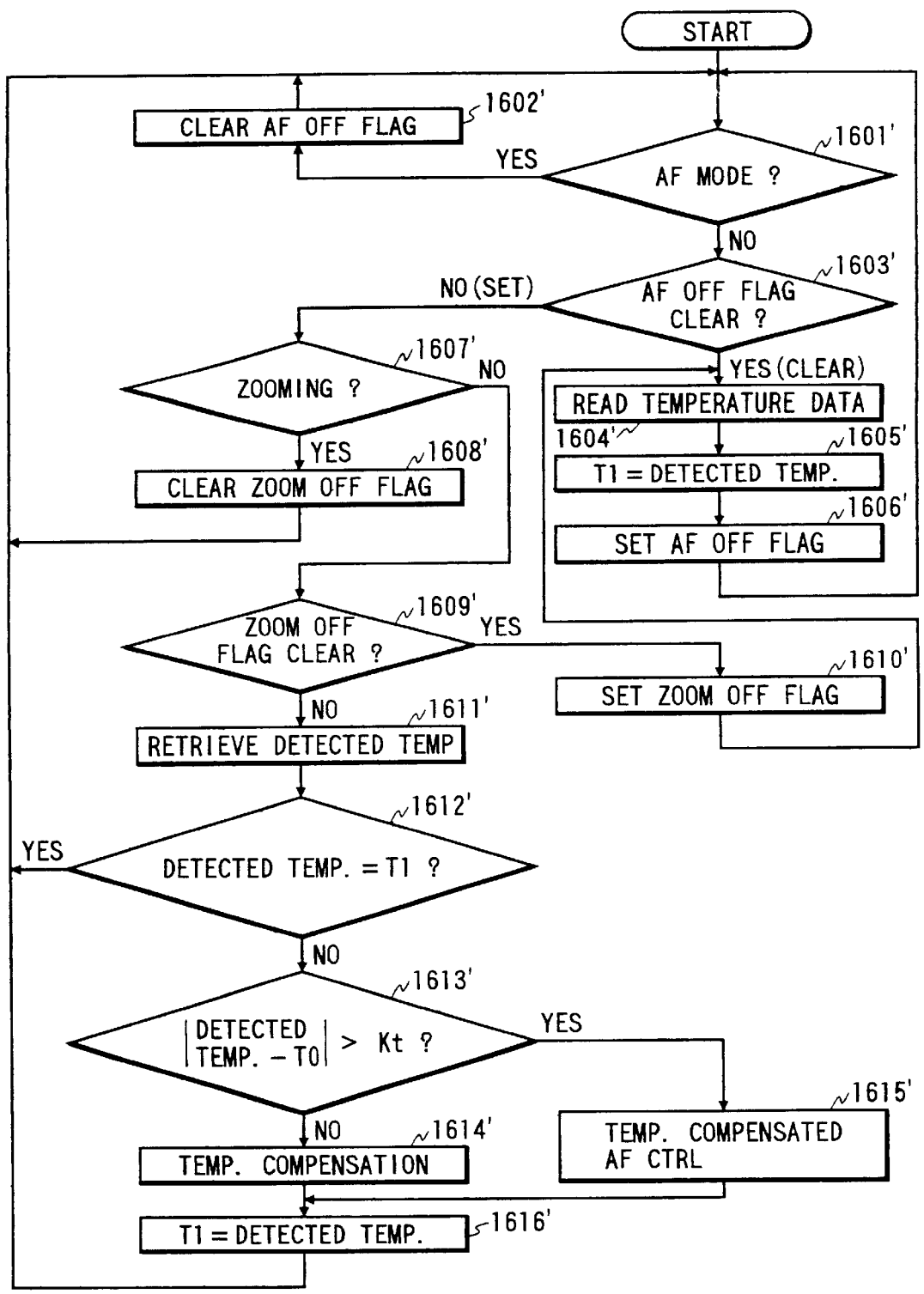
FIG. 15 is a flowchart to show the operation of the optical apparatus shown in FIG. 14.

The optical apparatus of the ninth embodiment shown in FIG. 14 and FIG. 15 is constructed in the same structure as the optical apparatus of the seventh embodiment except for provision of the manual zooming devices 20', 21' for zooming the variator lens 102 by manually driving the lens drive unit 8 through the controller 7'.

In FIG. 14, numerals 20', 21' designate manual zooming switches. With either switch kept in the on state, the switch 20' drives the variator lens 102 to the telephoto end or the switch 19' drives the variator lens 102 to the wide angle end.

In the ninth embodiment, while the operation of the AF device 16 is stopped by the AF controller 17 and when the view angle is changed by the zooming operation with the manual zooming switch 20', 21', the controller determines that the idle state for photography after idle is broken, it stores the ambient temperature at the end of the zoom operation by the manual zoom switch 20', 21', then it assumes that the idle state is again established thereafter, the controller makes the detector 12 detect the ambient temperature in such an idle state to store the ambient temperature detected, and it determines whether the temperature change value ΔT of the difference between the latest detected temperature obtained from the detector 12 after the ambient temperature and the reference temperature is more than the predetermined, specific value Kt as described previously. If the temperature change value ΔT is not more than the predetermined, specific value Kt, the controller obtains the correction amount (temperature corrected position data) Prr from the previous relation and to move RR 104 by the lens drive unit 9 so as to compensate for the variation in the position of the image plane of the optical system due to the change of ambient temperature. On the other hand, if the above temperature change value ΔT is more than the specific value Kt, the controller moves RR 104 to the in-focus position utilizing the function of the above AF unit 16, thereby correcting the variation in the position of the image plane of the optical system due to the change of ambient temperature.

Specifically, while the operation of the AF device 16 is stopped by the AF controller 17' and at the end of the zoom operation of the variator lens 102 by the manual zooming device 20', 21', the controller 7 stores the detected temperature obtained from the detector 12 and calculates the temperature change value ΔT of the difference between the latest detected temperature obtained from the detector 12 after the previously detected temperature and the reference temperature and a determining circuit not shown determines whether the absolute value of this temperature change value ΔT is more than the predetermined, specific value Kt. If the absolute value of the temperature change value ΔT is not more than the predetermined, specific value Kt, the controller obtains the correction amount (temperature corrected position data) Prr by the previous relation and moves RR 104 by the lens drive unit 9, thereby correcting the variation in the position of the image plane of the optical system due to the change of ambient temperature. On the other hand, if the absolute value of the temperature change value ΔT is more than the specific value Kt, the above AF device 16 is functioned to control the drive of the lens drive unit 9, based on the in-focus signal of the AF device 16, to move RR 104 to the in-focus position, thereby correcting the variation in the position of the image plane of the optical system due to the change of ambient temperature. This can correct the variation in the position of the image plane of the optical system due to the change of ambient temperature, thereby obtaining good image information.

The operation of the ninth embodiment is next explained using the flowchart of FIG. 15. It is determined at step 1601' whether the AF function of the AF device 16 is on or off. If it is on, the AF off flag is cleared at step 1602' and then the flow returns to step 1601'. If the AF function is off, it is determined at step 1603' whether the AF off flag is cleared. If cleared, a temperature detection value is read by the detector 12 at step 1604', the temperature detection value (detected temperature) is set as a detected temperature T1 in the MF (manual focus) mode at step 1605', and the AF off flag is set at step 1606'.

If at step 1603' the AF off flag is not cleared, that is, if it is set, step 1607' is carried out to determine whether the manual zooming switch 20' or 21' is on or off. If either one is on, the zoom off flag is cleared at step 1608' and then the flow returns to step 1601'. If they are off, it is determined at step 1609' whether the zoom off flag is cleared. If it is cleared, the zoom off flag is set at step 1610', a temperature detection value is read at step 1604', and the processes including step 1605' and the subsequent steps are carried out.

If at step 1609' the zoom off flag is not cleared, that is, if it is set, a temperature detection value is read at step 1611' and it is determined at step 1612' whether the temperature detection value (detected temperature) is equal to the previously detected temperature T1. If they are equal, the flow returns to step 1601'. If they are different, step 1613' is carried out to obtain the temperature change value ΔT of the difference between the later detected temperature obtained at step 1611' and the reference temperature T0 and to determine whether the absolute value thereof is more than the predetermined, specific value Kt. If the temperature change value ΔT is not more than the specific value Kt, step 1614' is carried out to execute the temperature compensated control to obtain the correction amount Prr from the previous relation and to move RR 104 so as to compensate for the variation in the position of the image plane of the optical system. On the other hand, if at step 1613' the absolute value of the temperature change value ΔT is more than the specific value Kt, step 1615' is carried out to execute the temperature compensated AF control to move RR 104 to the in-focus position by the AF function. Then step 1616' is carried out to update the previously detected temperature T1 to the later detected temperature. Then the flow returns to step 1601'.

As described above, the ninth embodiment is arranged in such a way that while the operation of the AF device 16 is stopped by the AF controller 17 and at the end of the zoom operation of the variator lens 102 by the manual zooming device 20', 21', if the temperature change value ΔT of the difference between the latest detected temperature obtained from the detector 12 and the reference temperature is not more than the predetermined, specific value Kt, the controller executes the temperature compensated control to obtain the correction amount Prr of RR 104 and to move RR 104 by the lens drive device 9 so as to correct the variation in the position of the image plane of the optical system and that, on the other hand, if the absolute value of the temperature change value ΔT is more than the specific value Kt, the controller executes the temperature compensated AF control to move RR 104 to the in-focus position utilizing the function of the above AF device 16, thereby obtaining good image information.

The manual zooming devices 20', 21' may be any means that can detect the operation such as on/off, without having to be limited to on/off of switch as described above.

As detailed above, since the optical apparatus of the present embodiment is constructed as described above, it can obtain good image information without defocus even with occurrence of temperature changes during zooming and during the operation of AF function or during stop of the AF function, or in the cases where the temperature is constant but deviates from the reference temperature.

The optical apparatus of the present embodiment uses a single detector 12, but it may be arranged to use plural detectors 12 for compensation for variations in the position of the image plane of the optical system 1, which enables higher-accuracy temperature compensated control.

The optical apparatus of the present embodiment was described as the example where the environmental changes were the temperature changes, but in the cases where the environmental changes are humidity changes or pressure changes, the apparatus can handle such changes in the same manner in the foregoing structure with provision of a detector thereof. For example, the apparatus may be arranged to have either a temperature detector or a humidity detector, or the apparatus may be arranged to have the both detectors so as to correct defocus due to the temperature changes and humidity changes.

As explained above, since the above embodiments are arranged so that during photography with operation of the AF device using the optical system (photographing lens) having the moving lens unit arranged to move on the optical axis for focus or magnification change, when the AF function is stopped for some reason and, for example, if environmental changes such as temperature changes or humidity changes occur, the AF function is utilized to control the drive of the moving lens unit by the lens drive unit according to the environment changes, the apparatus can correct the deviation in the position of the image plane caused by the environmental change with high accuracy and can maintain high optical performance, thereby providing the optical apparatus suitable for video cameras, silver-salt cameras, electronic still cameras, and so on.

Since the optical apparatus is arranged so that during photography with operation of the AF device using the optical system (photographing lens) having the moving lens unit arranged to move on the optical axis for focus or magnification change, when the AF function is stopped for some reason and, for example, if an environmental change such as a temperature change or a humidity change occurs, the AF function is utilized to control the drive of the moving lens unit by the lens drive unit according to the environmental change, or movement of the moving lens unit is properly determined every time from control information according to the environment change and the lens drive unit controls the drive of the moving lens unit, based thereon, the apparatus can correct the deviation in the position of the image plane caused by the environment change with high accuracy and can maintain high optical performance, thereby providing the optical apparatus suitable for video cameras, silver-salt cameras, electronic still cameras, and so on.

What is claimed is:

1. An optical apparatus having an image-forming optical system comprising a movable lens, said optical apparatus comprising:
   a manual operation member for being manually operated externally and for outputting an operation signal in accordance with a manual operation thereof;
   a lens drive mechanism for moving said movable lens in accordance with the operation signal from said manual operation member;
   a condition detecting device for detecting a temperature change or a humidity change of said optical apparatus and for outputting a state detection signal;
   a determining device for determining whether said manual operation member outputs the operation signal; and
   a control device for setting, when said determining device determines that said manual operation member does not output the operation signal, a correction amount of said movable lens in accordance with the state detection signal and for actuating said lens drive mechanism so as to move said movable lens for correction.
   wherein said control device memorizes the state detection signal from said condition detecting device in a case that said determining device determines that said manual operation member does not output the operation signal, and compares a memorized state detection signal with a current state detection signal from said condition detecting device so as to set the correction amount of said movable lens in accordance with a signal variation obtained by a comparison of the state detection signals.

2. An optical apparatus according to claim 1, wherein said image-forming optical system has a first lens for magnification change, and a second lens, located behind said first lens and along the optical axis, for correcting a change of the imaging position upon focus action and upon magnification change, said second lens corresponding to said movable lens.

3. An optical apparatus according to claim 1, wherein said manual operation member includes an operation member for performing a manual focus operation.

4. An optical apparatus according to claim 1, wherein said optical apparatus is a video camera and said movable lens of said image-forming optical system is a focus lens for adjusting the imaging position.

5. An optical apparatus according to claim 1, wherein said image-forming optical system comprises at least one plastic lens.

6. An optical apparatus according to claim 5, wherein said image-forming optical system has a first lens for magnification change, and a second lens, located behind said first lens and along the optical axis, for correcting a change of the imaging position upon focus action and upon magnification change, said second lens corresponding to said movable lens.

7. An optical apparatus according to claim 5, wherein said control device comprises a memory device for storing data for correction of said movable lens, and
   wherein said control device retrieves specific correction data out of said memory device, based on the detection result of said condition detecting device, and said lens drive mechanism moves said movable lens by the specific correction data.

8. An optical apparatus according to claim 7, wherein the data for correction is defined as a function of a difference between a detected value detected by said condition detecting device and a reference value.

9. An optical apparatus according to claim 7, wherein the data for correction is defined as a value obtained by multiplying the difference between a detected value detected by said condition detecting device and a reference value by correction coefficient data and adding position data of said movable lens to a result of the multiplication.

10. An optical apparatus according to claim 7, wherein said condition detecting device comprises a sensor using a thermally sensitive resistor.

11. An optical apparatus according to claim 7, wherein said condition detecting device comprises a sensor using a thermistor.

12. An optical apparatus according to claim 7, wherein said condition detecting device comprises an electrostatic capacity type sensor.

13. An optical apparatus having an image-forming optical system comprising a movable lens, said optical apparatus comprising:
   a manual operation member for being manually operated externally and for outputting an operation signal in accordance with a manual operation thereof;
   a lens drive mechanism for moving said movable lens in accordance with the operation signal from said manual operation member;
   a focus adjusting device for allowing an auto focus function so as to automatically adjust an imaging position by moving said movable lens on the basis of a detection result of a focus detection device;

a condition detecting device for detecting a temperature change or a humidity change of said optical apparatus, and outputting a state detection signal;

a determining device for determining whether said manual operation member outputs the operation signal, and for determining whether the auto focus function of said focus adjusting device is operated; and a control device for setting, when said determining device determines that said manual operation member does not output the operation signal and determines that the auto focus function of said focus adjusting device is not operated, a correction amount of said movable lens in accordance with the state detection signal so as to drive said lens drive mechanism to move said movable lens for correction.

* * * * *

UNITED STATES PATENT AND TRADEMARK OFFICE
CERTIFICATE OF CORRECTION

PATENT NO. : 6,822,688 B2
DATED : November 23, 2004
INVENTOR(S) : Seiya Ohta

It is certified that error appears in the above-identified patent and that said Letters Patent is hereby corrected as shown below:

Title page,
Insert Item: -- [*] Notice: This patent issued on a continued prosecution application filed under 37 CFR 1.53(d), and is subject to the twenty year patent term provisions of 35 U.S.C. 154(a)(2). -- Item [56], References Cited, U.S. PATENT DOCUMENTS, -- 5,210,620  5/1993  Kim        386/38 -- should be inserted.
Item [57], ABSTRACT,
Line 6, "detecting-device" should read -- detecting device --.

Column 13,
Line 2, "6f" should read -- of --.
Line 61, "step 14051" should read -- step 1405' --.

Column 17,
Line 63, "correction." should read -- correction, --.

Signed and Sealed this

Twenty-first Day of June, 2005

JON W. DUDAS
*Director of the United States Patent and Trademark Office*